United States Patent
Kobayashi et al.

(10) Patent No.: US 8,784,201 B2
(45) Date of Patent: Jul. 22, 2014

(54) INFORMATION STORAGE MEDIUM, GAME SYSTEM, AND INPUT DETERMINATION METHOD

(75) Inventors: Tsuyoshi Kobayashi, Kawasaki (JP); Kohtaro Taniguchi, Yokohama (JP); Yasuhiro Nishimoto, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 839 days.

(21) Appl. No.: 13/013,068

(22) Filed: Jan. 25, 2011

(65) Prior Publication Data

US 2011/0183765 A1 Jul. 28, 2011

(30) Foreign Application Priority Data

Jan. 27, 2010 (JP) ................................ 2010-016082

(51) Int. Cl.
*A63F 13/10* (2006.01)

(52) U.S. Cl.
USPC .............................................. 463/31; 463/42

(58) Field of Classification Search
USPC ................................ 463/7, 23, 31, 36–38, 42
See application file for complete search history.

(56) References Cited

U.S. PATENT DOCUMENTS

| 2002/0055383 A1* | 5/2002 | Onda et al. ..................... 463/36 |
| 2007/0079690 A1 | 4/2007 | Chiwata |
| 2008/0200223 A1 | 8/2008 | Maeda et al. |
| 2009/0069096 A1 | 3/2009 | Nishimoto |
| 2009/0270169 A1 | 10/2009 | Kondo |
| 2010/0022287 A1 | 1/2010 | Chiwata |

FOREIGN PATENT DOCUMENTS

| EP | 1 920 804 A1 | 5/2008 |
| EP | 2 039 402 A2 | 3/2009 |
| GB | 2 438 449 A | 11/2007 |
| JP | A-2003-210838 | 7/2003 |
| JP | A-2006-318385 | 11/2006 |
| JP | A-2007-090076 | 4/2007 |
| JP | A-2009-082696 | 4/2009 |

OTHER PUBLICATIONS

Extended European Search Report issued in European Patent Application No. 11152391.6 dated May 3, 2011.

* cited by examiner

*Primary Examiner* — Omkar Deodhar
(74) *Attorney, Agent, or Firm* — Oliff PLC

(57) ABSTRACT

A game system determines whether or not an input start timing coincides with an auxiliary start timing that corresponds to a reference start timing and differs from the reference start timing, and determines whether or not input information that has been input during a given auxiliary determination period that starts from the auxiliary start timing coincides with defined input information.

11 Claims, 34 Drawing Sheets

FIG. 11

| ID | REFERENCE | AUXILIARY 1 | AUXILIARY 2 | AUXILIARY 3 | DEFINED INPUT INFORMATION |
|---|---|---|---|---|---|
| | PERIOD (START TO END) | PERIOD (START TO END) | PERIOD (START TO END) | PERIOD (START TO END) | |
| 1 | BPa(BSa~BEa) | PP1a(PS1a~PE1a) | PP2a(PS2a~PE2a) | PP3a(PS3a~PE3a) | MD1a, MD2a, MD3a |
| 2 | BPb(BSb~BEb) | PP1b(PS1b~PE1b) | PP2b(PS2b~PE2b) | PP3b(PS3b~PE3b) | MD1b, MD2b, MD3b |
| 3 | BPc(BSc~BEc) | PP1c(PS1c~PE1c) | PP2c(PS2c~PE2c) | PP3c(PS3c~PE3c) | MD1c, MD2c, MD3c |
| ... | ... | ... | ... | ... | ... |

WHEN DISTANCE IS L1

VIRTUAL THREE-DIMENSIONAL SPACE

WHEN DISTANCE IS L2 (L1≤LD<L2)

VIRTUAL THREE-DIMENSIONAL SPACE

WHEN DISTANCE IS L1

VIRTUAL THREE-DIMENSIONAL SPACE

WHEN DISTANCE IS L2 (L1≤LD<L2)

θ2<θ1

VIRTUAL THREE-DIMENSIONAL SPACE

REAL SPACE

VIRTUAL THREE-DIMENSIONAL SPACE

BO1   BO2   BO3

INFORMATION STORAGE MEDIUM, GAME SYSTEM, AND INPUT DETERMINATION METHOD

Japanese Patent Application No. 2010-16082, filed on Jan. 27, 2010, is hereby incorporated by reference in its entirety.

BACKGROUND OF THE INVENTION

The present invention relates to an information storage medium, a game system, and an input determination method.

A game system that implements a fitness game has been known (see JP-A-2006-318385, for example). Such a game system displays a body movement instruction image on a display section, determines whether or not an input start timing of the player coincides with a reference start timing of a determination period, and determines whether or not input information that has been input during the determination period coincides with defined input information.

However, since the above determination process is likely to determine that the input start timing does not coincide with the reference start timing, an input determination process that satisfies the player may not be implemented.

SUMMARY

According to a first aspect of the invention, there is provided a non-transitory computer-readable information storage medium storing a program that determines an input from an input section, the program causing a computer to function as:

a timing determination section that determines whether or not an input start timing coincides with a reference start timing; and an input information determination section that determines whether or not input information that has been input during a given reference determination period that starts from the reference start timing coincides with defined input information, the timing determination section determining whether or not the input start timing coincides with an auxiliary start timing that corresponds to the reference start timing, but differs from the reference start timing; and the input information determination section determining whether or not input information that has been input during a given auxiliary determination period that starts from the auxiliary start timing coincides with the defined input information.

According to a second aspect of the invention, there is provided a game system that determines an input from an input section, the game system comprising:

a timing determination section that determines whether or not an input start timing coincides with a reference start timing; and an input information determination section that determines whether or not input information that has been input during a given reference determination period that starts from the reference start timing coincides with defined input information, the timing determination section determining whether or not the input start timing coincides with an auxiliary start timing that corresponds to the reference start timing, but differs from the reference start timing; and the input information determination section determining whether or not input information that has been input during a given auxiliary determination period that starts from the auxiliary start timing coincides with the defined input information.

According to a third aspect of the invention, there is provided an input determination method that is implemented by a game system that determines an input from an input section, the input determination method comprising:

determining whether or not an input start timing coincides with a reference start timing;

determining whether or not input information that has been input during a given reference determination period that starts from the reference start timing coincides with defined input information;

determining whether or not the input start timing coincides with an auxiliary start timing that corresponds to the reference start timing, but differs from the reference start timing; and determining whether or not input information that has been input during a given auxiliary determination period that starts from the auxiliary start timing coincides with the defined input information.

BRIEF DESCRIPTION OF THE SEVERAL VIEWS OF THE DRAWING

FIG. 11 is a table illustrating determination information according to one embodiment of the invention.

DETAILED DESCRIPTION OF THE EMBODIMENT

Figure 1:
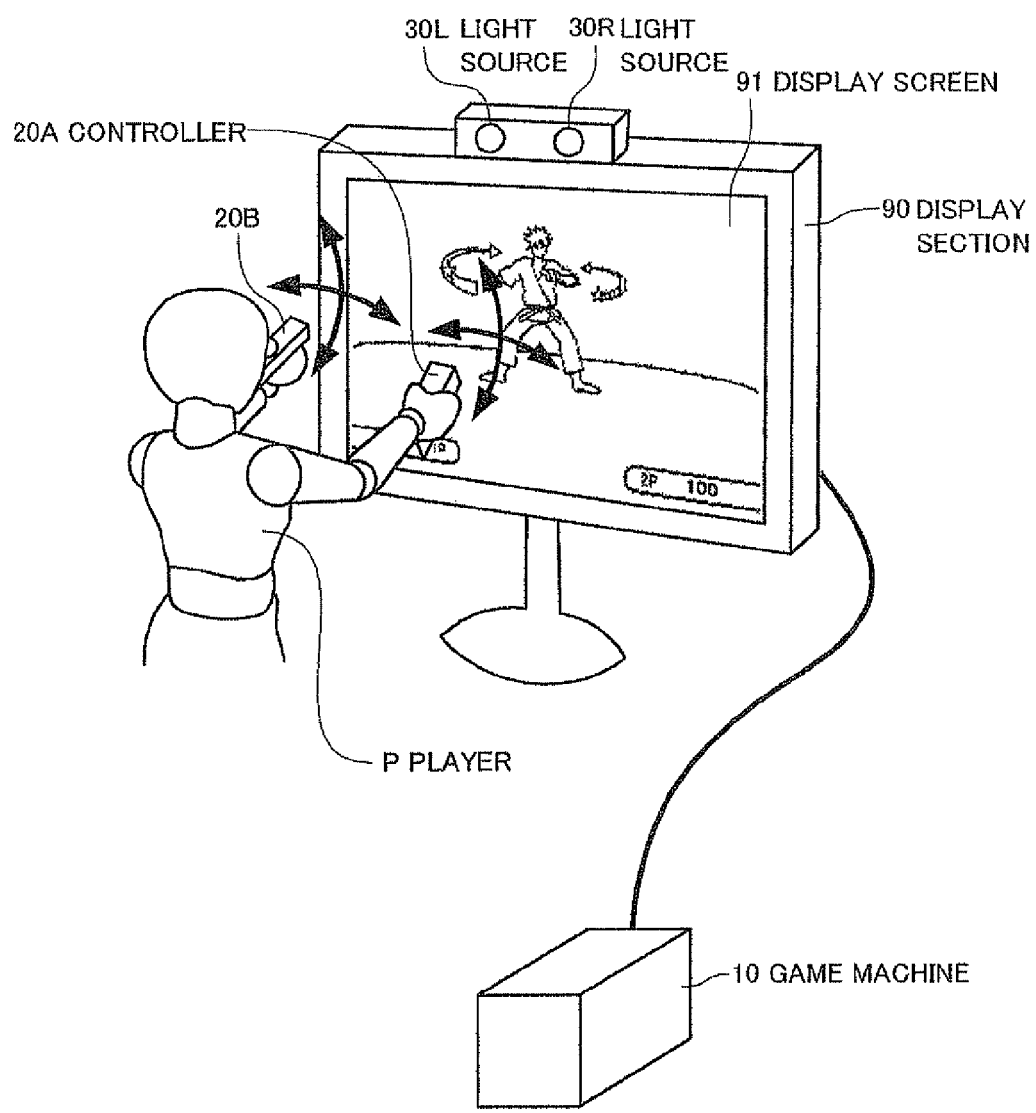
FIG. 1 is a diagram illustrating a first game system according to one embodiment of the invention.

The invention may provide an information storage medium, a game system, and an input determination method that can increase the possibility that the input timings are determined to coincide in an input determination process.

(1) One embodiment of the invention relates to a non-transitory computer-readable information storage medium storing a program that determines an input from an input section, the program causing a computer to function as:

a timing determination section that determines whether or not an input start timing coincides with a reference start timing; and an input information determination section that determines whether or not input information that has been input during a given reference determination period that starts from the reference start timing coincides with defined input information, the timing determination section determining whether or not the input start timing coincides with an auxiliary start timing that corresponds to the reference start timing, but differs from the reference start timing; and the input information determination section determining whether or not input information that has been input during a given auxiliary determination period that starts from the auxiliary start timing coincides with the defined input information.

Another embodiment of the invention relates to a game system including the above sections.

According to the above information storage medium or game system, since whether or not the input start timing coincides with the reference start timing, and whether or not the input start timing coincides with the auxiliary start timing are determined, it is possible to increase the possibility that the timing determination section determines that the start timings coincide.

(2) In the above information storage medium or game system, a plurality of auxiliary start timings that differ from each other may be defined corresponding to the reference start timing;

the timing determination section may determine whether or not the input start timing coincides with each of the plurality of auxiliary start timings; and the input information determination section may determine whether or not input information that has been input during a given auxiliary determination period that starts from an auxiliary start timing among the plurality of auxiliary start timings that has been determined to coincide with the input start timing, coincides with the defined input information.

According to the above configuration, since a plurality of auxiliary start timings are defined, the input timing can be compared with a plurality of start timings. This makes it possible to increase the possibility that the timing determination section determines that the start timings coincide.

(3) In the above information storage medium or game system, a plurality of pieces of defined input information that differ from each other may be defined corresponding to the reference determination period; and the input information determination section may determine whether or not input information that has been input during the reference determination period that starts from the reference start timing coincides with at least one of the plurality of pieces of defined input information when the input start timing coincides with the reference start timing.

This makes it possible to increase the possibility that the input information determination section determines that the input information that has been input during the reference determination period coincides with the defined input information.

(4) In the above information storage medium or game system, a plurality of pieces of defined input information that differ from each other may be defined corresponding to the auxiliary determination period; and the input information determination section may determine whether or not input information that has been input during the auxiliary determination period that starts from the auxiliary start timing coincides with at least one of the plurality of pieces of defined input information when the input start timing coincides with the auxiliary start timing.

This makes it possible to increase the possibility that the input information determination section determines that the input information that has been input during the auxiliary determination period coincides with the defined input information.

(5) In the above information storage medium or game system, the auxiliary determination period may end at an end timing of the reference determination period corresponding to the auxiliary determination period.

According to the above configuration, since the auxiliary determination period ends at the end timing of the reference determination period even when the timing is determined at the start timing of the auxiliary determination period, or the input information is determined during the auxiliary determination period, the input determination process performed in another reference determination period is not affected.

(6) In the above information storage medium or game system, a first reference determination period that starts from a first reference start timing, and a second reference determination period that starts from a second reference start timing that occurs after the first reference start timing may be defined so as not to overlap; and an auxiliary determination period corresponding to the first reference determination period may end before the second reference start timing.

According to the above configuration, since the auxiliary determination period corresponding to the first reference determination period ends before the second reference start timing, timing determination at the second reference start timing and input information determination during the second reference determination period are not affected even if the input information is determined during the auxiliary determination period corresponding to the first reference determination period.

(7) In the above information storage medium or game system, the program may cause the computer to further function as an image generation section that generates an image that instructs the reference start timing and the reference determination period.

This makes it possible for the player to perform an input operation while observing the image that instructs the reference start timing and the reference determination period. Specifically, input instructions for achieving coincidence with the reference start timing and the reference determination period can be provided to the player by instructing the reference start timing and the reference determination period.

(8) In the above information storage medium or game system, the defined input information may include a defined acceleration group including a plurality of accelerations;

the input information determination section may determine whether or not an acceleration group including a plurality of accelerations detected from the input section during the reference determination period coincides with the defined acceleration group when the input start timing coincides with the reference start timing; and the input information determination section may determine whether or not an acceleration group including a plurality of accelerations detected from the input section during the auxiliary determination period coincides with the defined acceleration group when the input start timing coincides with the auxiliary start timing.

(9) In the above information storage medium or game system, the defined input information may include a defined moving path;

the input information determination section may determine whether or not a moving path detected from the input section during the reference determination period coincides with the defined moving path when the input start timing coincides with the reference start timing; and the input information determination section may determine whether or not a moving path detected from the input section during the auxiliary determination period coincides with the defined moving path when the input start timing coincides with the auxiliary start timing.

(10) In the above information storage medium or game system, the defined input information may include a defined moving vector that defines a moving amount and a moving direction of a feature point between images;

the input information determination section may determine whether or not a moving vector between a plurality of input images acquired from the input section during the reference determination period coincides with the defined moving vector when the input start timing coincides with the reference start timing; and the input information determination section may determine whether or not a moving vector between a plurality of input images acquired from the input section during the auxiliary determination period coincides with the defined moving vector when the input start timing coincides with the auxiliary start timing.

(11) Another embodiment the invention relates to an input determination method that is implemented by a game system that determines an input from an input section, the input determination method including:

determining whether or not an input start timing coincides with a reference start timing;

determining whether or not input information that has been input during a given reference determination period that starts from the reference start timing coincides with defined input information;

determining whether or not the input start timing coincides with an auxiliary start timing that corresponds to the reference start timing, but differs from the reference start timing; and determining whether or not input information that has been input during a given auxiliary determination period that starts from the auxiliary start timing coincides with the defined input information.

Embodiments of the invention are described below. Note that the following embodiments do not unduly limit the scope of the invention as stated in the claims.

Note also that all of the elements described below should not necessarily be taken as essential elements of the invention.

1. First Embodiment 1-1. First Game System

FIG. 1 is a schematic external view illustrating a first game system (first image generation system or first input determination system) according to a first embodiment of the invention. The first game system according to this embodiment includes a display section 90 that displays a game image, a game machine 10 (game machine main body) that performs a game process and the like, a first controller 20A (i.e., input section), and a second controller 20B (i.e., input section), the first controller 20A and the second controller 20B being held by a player P with either hand so that the positions and the directions thereof can be arbitrarily changed. In the example illustrated in FIG. 1, the game machine 10 and each of the controllers 20A and 20B exchange various types of information via wireless communication.

Figure 2:
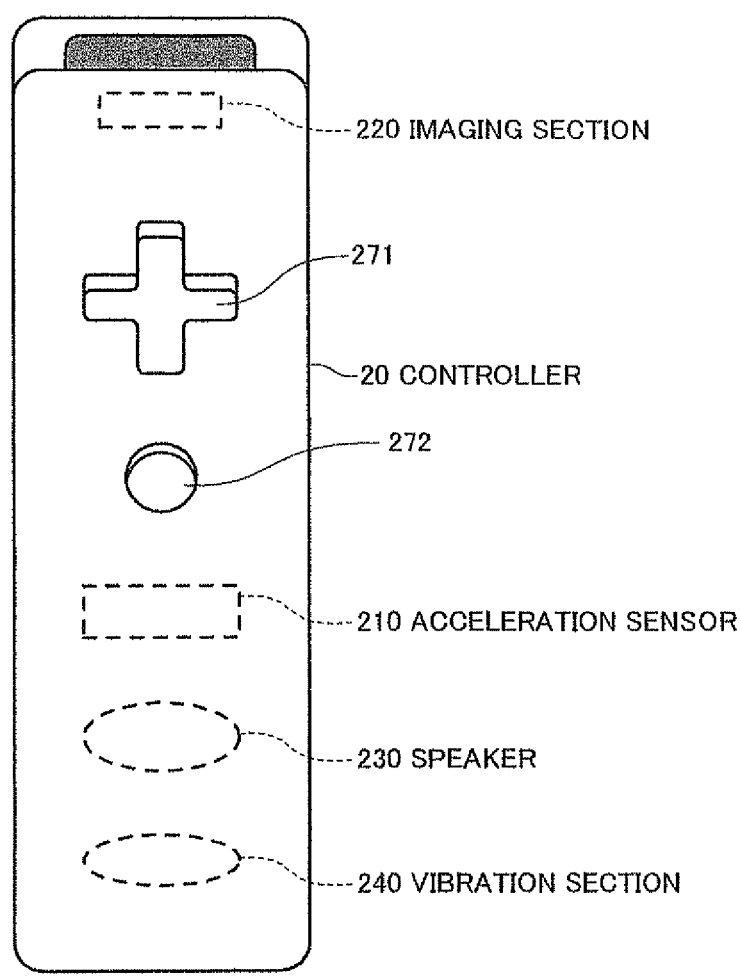
FIG. 2 is a diagram illustrating an example of a controller used for a first game system according to one embodiment of the invention.

FIG. 2 is a schematic external view illustrating the controller 20 according to this embodiment. The controller 20 includes an arrow key 271 and a button 272. The controller 20 also includes an acceleration sensor 210 as a physical sensor that detects information which changes corresponding to the tilt and the movement of the controller.

The acceleration sensor 210 according to this embodiment is configured as a three-axis acceleration sensor, and detects three-axis acceleration vectors. Specifically, the acceleration sensor 210 detects a change in velocity and direction within a given time as the acceleration vector of the controller along each axis.

As illustrated in FIG. 1, when the player P has moved the first controller 20A and the second controller 20B while holding the first controller 20A and the second controller 20B, the tilt and the movement of each controller change. Each controller detects the acceleration vector that changes based on the tilt and the movement of the controller, and transmits the acceleration vector to the game machine 10 via wireless communication. The game machine 10 performs a given process based on the acceleration vector of each controller.

The controller 20 has a function of indicating (pointing) an arbitrary position within a display screen 91.

As illustrated in FIG. 1, a pair of light sources 30R and 30L (reference position recognition objects) is disposed around the display section 90 at a given position with respect to the display screen 91. The light sources 30R and 30L are disposed at a predetermined interval along the upper side of the display section 90, and emit infrared radiation (i.e., invisible light) to a body (object). As illustrated in FIG. 2, an imaging section 220 that acquires an image in front of the controller 20 is provided on the front side of the controller 20.

A method of calculating the indication position of the controller 20 within the display screen 91 is described below with reference to FIG. 3. A rectangular area illustrated in FIG. 3 indicates a captured image PA acquired by the imaging section 220 (image sensor). The captured image PA reflects the position and the direction of the controller 20. First, a position RP of an area RA corresponding to the light source 30R and a position LP of an area LA corresponding to the light source 30L included in the captured image PA are calculated. The positions RP and LP are indicated by position coordinates determined by a two-dimensional coordinate system (XY-axis coordinate system) in the captured image PA. The distance between the light sources 30R and 30L, and the relative positions of the light sources 30R and 30L that are disposed at a given position with respect to the display screen 91, are known in advance. Therefore, the game machine 10 can calculate the indication position (pointing position) of the controller 20 within the display screen 91 from the calculated coordinates of the positions RP and LP.

Specifically, the origin O of the captured image PA is determined to be the indication position of the controller 20. The indication position is calculated from the relative positional relationship between the origin O of the captured image PA, the positions RP and LP in the captured image PA, and a display screen area DA that is an area in the captured image PA corresponding to the display screen 91.

Figure 3:
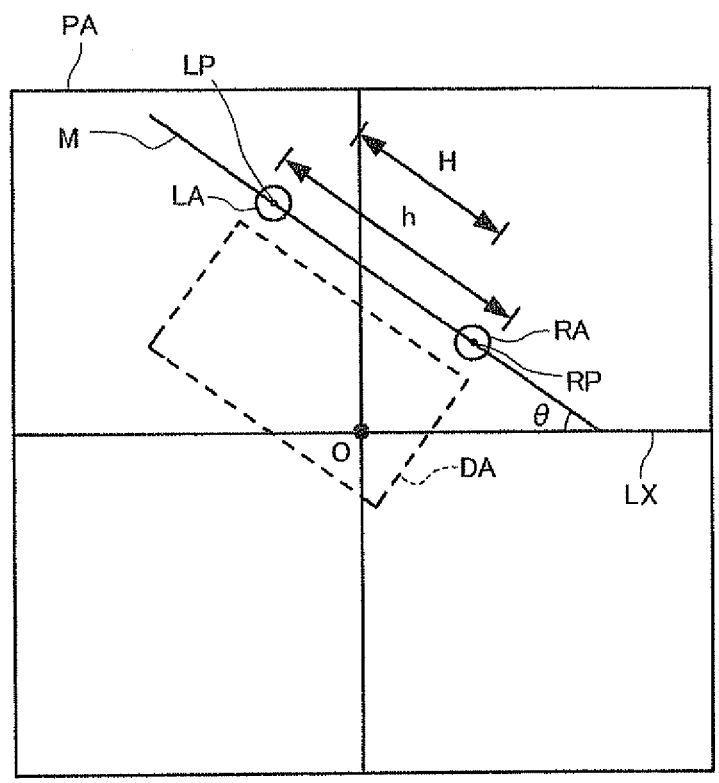
FIG. 3 is a diagram illustrating the principle of pointing performed using a controller used for a first game system according to one embodiment of the invention.

In the example illustrated in FIG. 3, the positions RP and LP are situated above the center of the captured image PA to some extent in a state in which a line segment that connects the positions RP and LP is rotated clockwise by theta degrees with respect to a reference line LX (X axis) of the captured image PA. In the example illustrated in FIG. 3, the origin O corresponds to a predetermined position in the lower right area of the display screen area DA, so that the coordinates of the indication position of the controller 20 within the display screen 91 can be calculated.

The reference position recognition object is not particularly limited insofar as the indication position of the controller within the game screen can be specified. The number of light sources need not necessarily be two. It suffices that the reference position recognition object have a shape that allows the relative positional relationship with the display screen 91 to be specified. The number of reference position recognition objects may be one, or three or more.

1-2. Configuration

Figure 4:
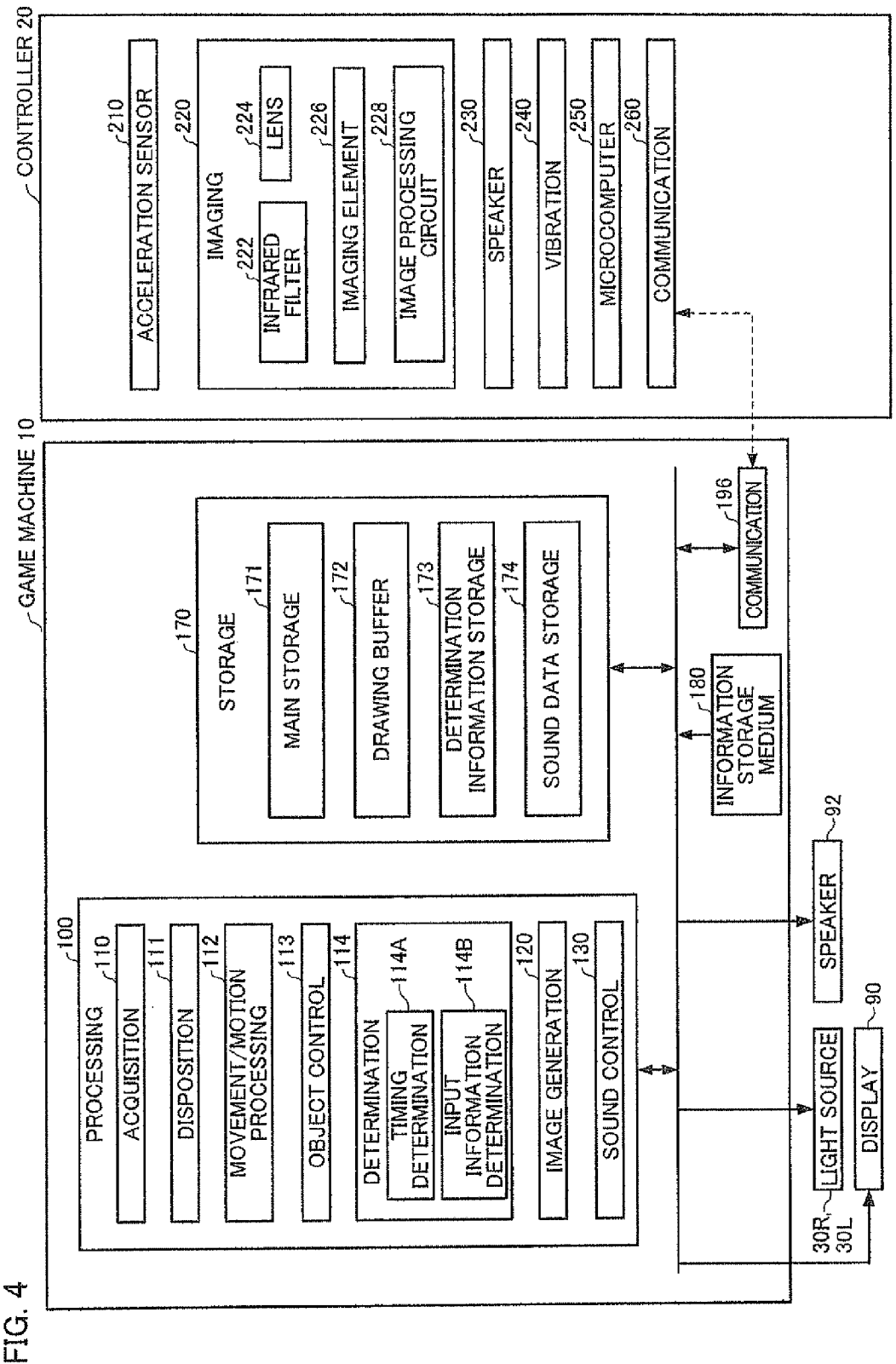
FIG. 4 is a functional block diagram illustrating a first game system according to one embodiment of the invention.

FIG. 4 illustrates an example of a functional block diagram of the first game system according to the first embodiment.

Note that the first game system need not necessarily include all of the sections illustrated in FIG. 4. The first game system may have a configuration in which some of the sections illustrated in FIG. 4 are omitted. The first game system includes the game machine 10, the controller 20 (i.e., input section), the display section (display device) 90, a speaker 92, and the light sources 30R and 30L.

The light sources 30R and 30L may be a light-emitting diode (LED) that emits infrared radiation (i.e., invisible light), for example. The light sources 30R and 30L are disposed at a given position with respect to the display section 90. In this embodiment, the light sources 30R and 30L are disposed at a predetermined interval.

The controller 20 includes the acceleration sensor 210, the imaging section 220, a speaker 230, a vibration section 240, a microcomputer 250, and a communication section 260.

In this embodiment, the controller 20 is used as an example of the input section. An image input section, a sound input section, or a pressure sensor may be used as the input section.

The acceleration sensor 210 detects three-axis (X axis, Y axis, and Z axis) accelerations. Specifically, the acceleration sensor 210 detects accelerations in the vertical direction (Y-axis direction), the transverse direction (X-axis direction), and the forward/backward direction (Z-axis direction). The acceleration sensor 210 detects accelerations every 5 msec. The acceleration sensor 210 may detect one-axis, two-axis, or six-axis accelerations. The accelerations detected by the acceleration sensor are transmitted to the game machine 10 through the communication section 260.

The imaging section 220 includes an infrared filter 222, a lens 224, an imaging element (image sensor) 226, and an image processing circuit 228. The infrared filter 222 is disposed on the front side of the controller, and allows only infrared radiation contained in light incident from the light sources 30R and 30L (disposed at a given position with respect to the display section 90) to pass through. The lens 224 condenses the infrared radiation that has passed through the infrared filter 222, and emits the infrared radiation to the imaging element 226. The imaging element 226 is a solid-state imaging element such as a CMOS sensor or a CCD. The imaging element 226 images the infrared radiation condensed by the lens 224 to generate a captured image. The image processing circuit 228 processes the captured image generated by the imaging element 226. For example, the image processing circuit 228 processes the captured image generated by the imaging element 226 to detect a high-luminance component, and detects light source position information (specified position) within the captured image. The detected position information is transmitted to the game machine 10 through the communication section 260.

The speaker 230 outputs sound acquired from the game machine 10 through the communication section 260. In this embodiment, the speaker 230 outputs confirmation sound and effect sound transmitted from the game machine 10.

The vibration section (vibrator) 240 receives a vibration signal transmitted from the game machine 10, and operates based on the vibration signal.

The microcomputer 250 outputs sound or operates the vibrator based on data received from the game machine 10. The microcomputer 250 causes the communication section 260 to transmit the accelerations detected by the acceleration sensor 210 to the game machine 10, or causes the communication section 260 to transmit the position information detected by the imaging section 220 to the game machine 10.

The communication section 260 includes an antenna and a wireless module, and exchanges data with the game machine 10 via wireless communication using the Bluetooth (registered trademark) technology, for example. The communication section 260 according to this embodiment transmits the accelerations detected by the acceleration sensor 210, the position information detected by the imaging section 220, and the like to the game machine 10 at alternate intervals of 4 msec and 6 msec. The communication section 260 may be connected to the game machine 10 via a communication cable, and may exchange information with the game machine 10 via the communication cable.

The controller 20 may include operating sections such as a lever (analog pad), a mouse, and a touch panel display in addition to the arrow key 271 and the button 272. The controller 20 may include a gyrosensor that detects an angular velocity applied to the controller 20.

The game machine 10 according to this embodiment is described below. The game machine 10 according to this embodiment includes a storage section 170, a processing section 100, an information storage medium 180, and a communication section 196.

The storage section 170 serves as a work area for the processing section 100, the communication section 196, and the like. The function of the storage section 170 may be implemented by hardware such as a RAM (VRAM).

The storage section 170 according to this embodiment includes a main storage section 171, a drawing buffer 172, a determination information storage section 173, and a sound data storage section 174. The drawing buffer 172 stores an image generated by an image generation section 120.

The determination information storage section 173 stores determination information. The determination information includes information for the timing determination section 114A to perform the determination process in synchronization with the music data reproduction time, such as the reference start/end timing, the reference determination period (i.e., determination period) from the reference start timing to the reference end timing, the auxiliary start/end timing, and the auxiliary determination period (i.e., determination period) from the auxiliary start timing to the auxiliary end timing. For example, the determination information storage section 173 stores the reference start/end timing of the reference determination period and the auxiliary start/end timing of the auxiliary determination period in synchronization with the reproduction time when the reproduction start time is "0".

The determination information stored in the determination information storage section 173 includes defined input information (model input information) corresponding to each determination process performed by the input information determination section 114B. The defined input information may be a set of x, y, and z-axis accelerations (defined acceleration group) corresponding to the determination period of each determination process.

The auxiliary determination period may end at the end timing of the reference determination period corresponding to the auxiliary determination period. When a first reference determination period that starts from a first reference start timing, and a second reference determination period that starts from a second reference start timing that occurs after the first reference start timing are defined so as not to overlap, the auxiliary determination period corresponding to the first reference determination period may end before the second reference start timing.

The sound data storage section 174 stores music data, effect sound, and the like.

The processing section 100 performs various processes according to this embodiment based on data read from a program stored in the information storage medium 180. Specifically, the information storage medium 180 stores a program that causes a computer to function as each section according to this embodiment (i.e., a program that causes a computer to perform the process of each section).

The communication section 196 can communicate with another game machine through a network (Internet). The function of the communication section 196 may be implemented by hardware such as a processor, a communication ASIC, or a network interface card, a program, or the like. The communication section 196 can perform cable communication and wireless communication.

The communication section 196 includes an antenna and a wireless module, and exchanges data with the communication section 260 of the controller 20 using the Bluetooth (registered trademark) technology, for example. For example, the communication section 196 transmits sound data (e.g., confirmation sound and effect sound) and the vibration signal to the controller 20, and receives the information (e.g., acceleration vector and pointing position) detected by the acceleration sensor and the image sensor of the controller 20 at alternate intervals of 4 msec and 6 msec.

A program that causes a computer to function as each section according to this embodiment may be distributed to the information storage medium 180 (or the storage section 170) from a storage section or an information storage medium included in a server through a network. Use of the information storage medium included in the server is also included within the scope of the invention.

The processing section 100 (processor) performs a game process, an image generation process, and a sound control process based on the information received from the controller 20, a program loaded into the storage section 170 from the information storage medium 180, and the like.

The processing section 100 according to this embodiment performs various game processes. For example, the processing section 100 starts the game when game start conditions have been satisfied, proceeds with the game, finishes the game when game finish conditions have been satisfied, and performs an ending process when the final stage has been cleared. The processing section 100 also reproduces the music data stored in the sound data storage section 174.

The processing section 100 according to this embodiment functions as an acquisition section 110, a disposition section 111, a movement/motion processing section 112, an object control section 113, a determination section 114, an image generation section 120, and a sound control section 130.

The acquisition section 110 acquires input information received from the input section (controller 20). For example, the acquisition section 110 acquires three-axis accelerations detected by the acceleration sensor 210.

The disposition section 111 disposes an object in a virtual space (virtual three-dimensional space (object space) or virtual two-dimensional space). For example, the disposition section 111 disposes a display object (e.g., building, stadium, car, tree, pillar, wall, or map (topography)) in the virtual space in addition to a character and an instruction object. The virtual space is a virtual game space. For example, the virtual three-dimensional space is a space in which an object is disposed at three-dimensional coordinates (X, Y, Z) (e.g., world coordinate system or virtual camera coordinate system).

For example, the disposition section 111 disposes an object (i.e., an object formed by a primitive (e.g., polygon, free-form surface, or subdivision surface)) in the world coordinate system. The disposition section 111 determines the position and the rotation angle (synonymous with orientation or direction) of the object in the world coordinate system, and disposes the object at the determined position (X, Y, Z) and the determined rotation angle (rotation angles around the X, Y, and Z-axes). The disposition section 111 may dispose a scaled object in the virtual space.

The movement/motion processing section 112 calculates the movement/motion of the object in the virtual space. Specifically, the movement/motion processing section 112 causes the object to move in the virtual space or to make a motion (animation) based on the input information received from the input section, a program (movement/motion algorithm), various types of data (motion data), and the like. More specifically, the movement/motion processing section 112 sequentially calculates movement information (e.g., moving speed, acceleration, position, and direction) and motion information (i.e., the position or the rotation angle of each part that forms the object) about the object every frame (1/60th of a second). The term "frame" refers to a time unit used for the object movement/motion process and the image generation process.

When moving the object in the virtual two-dimensional space, the movement/motion processing section 112 may move the object (e.g., instruction mark) in a given moving direction at a predetermined moving speed.

The object control section 113 controls the size of the object. For example, the object control section 113 scales up/down (enlarges or reduces) a modeled object (scaling factor: 1). The object control section 113 changes the scaling factor of the object with the lapse of time.

Specifically, the object control section 113 changes the scaling factor of the object from 1 to 2 during a period from the start timing to the end timing of the reference determination period, and scales up the object based on the scaling factor that has been changed. The object control section 113 may control the degree by which the scaling factor of the object is changed with the lapse of time. For example, the object control section 113 may change the scaling factor of the object from 1 to 2 during a period from the start timing to the end timing of the reference determination period, or may change the scaling factor of the object from 1 to 3 during a period from the start timing to the end timing of the reference determination period.

The determination section 114 includes a timing determination section 114A and an input information determination section 114B.

The timing determination section 114A determines whether or not an input start timing coincides with a reference start timing (a model start timing). The timing determination section 114A also determines whether or not the input start timing coincides with an auxiliary start timing that is defined based on the reference start timing and differs from the reference start timing.

When a plurality of auxiliary start timings that differ from each other are defined corresponding to the reference start timing, the timing determination section 114A determines whether or not the input start timing coincides with each of the plurality of auxiliary start timings. Specifically, the timing determination section 114A determines whether or not the input start timing coincides with the auxiliary start timing at each of the plurality of auxiliary start timings. The timing determination section 114A may determine whether or not the input start timing coincides with the auxiliary start timing at one or more of the plurality of auxiliary start timings. The timing determination section 114A may determine whether or not the input start timing coincides with the auxiliary start timing at one of the plurality of auxiliary start timings.

When the input start timing coincides with the reference start timing, the timing determination section 114A determines whether or not the input end timing coincides with the end timing of the reference determination period. When the input start timing coincides with the auxiliary start timing, the timing determination section 114A determines whether or not the input end timing coincides with the end timing of an auxiliary determination period.

The input information determination section 114B determines whether or not input information that has been input during a given reference determination period (a given model determination period) that starts from the reference start timing coincides with defined input information. The input information determination section 114B may determine whether or not the input information that has been input during a given reference determination period that starts from the reference start timing coincides with the defined input information when the input start timing coincides with the reference start timing.

The input information determination section 114B also determines whether or not input information that has been input during a given auxiliary determination period that starts from the auxiliary start timing coincides with the defined input information. The input information determination section 114B may determine whether or not the input information that has been input during a given auxiliary determination period that starts from the auxiliary start timing coincides with the defined input information when the input start timing coincides with the auxiliary start timing.

When a plurality of auxiliary start timings that differ from each other are defined corresponding to the reference start timing, the input information determination section 114B determines whether or not the input information that has been input during a given auxiliary determination period that starts from the auxiliary start timing that has been determined by the timing determination section 114A to coincide with the input start timing, coincides with the defined input information.

When a plurality of pieces of defined input information that differ from each other are defined corresponding to the reference determination period, the input information determination section 114B determines whether or not the input information that has been input during the reference determination period that starts from the reference start timing coincides with at least one of the plurality of pieces of defined input information when the timing determination section 114A has determined that the input start timing coincides with the reference start timing.

When a plurality of pieces of defined input information that differ from each other are defined corresponding to the auxiliary determination period, the input information determination section 114B determines whether or not the input information that has been input during the auxiliary determination period that starts from the auxiliary start timing coincides with at least one of the plurality of pieces of defined input information when the timing determination section 114A has determined that the input start timing coincides with the auxiliary start timing.

When the defined input information includes a defined acceleration group (a model acceleration group) including a plurality of accelerations, the input information determination section 114E performs the following process. Specifically, the input information determination section 114B determines whether or not an acceleration group including a plurality of accelerations detected from the input section during the reference determination period coincides with the defined acceleration group when the input start timing coincides with the reference start timing, and determines whether or not an acceleration group including a plurality of accelerations detected from the input section during the auxiliary determination period coincides with the defined acceleration group when the input start timing coincides with the auxiliary start timing.

When a defined moving path (a model moving path) is used as the defined input information, the input information determination section 114B performs the following process. Specifically, the input information determination section 114B determines whether or not a moving path detected from the input section during the reference determination period coincides with the defined moving path when the input start timing coincides with the reference start timing, and determines whether or not a moving path detected from the input section during the auxiliary determination period coincides with the defined moving path when the input start timing coincides with the auxiliary start timing.

When the defined input information includes a defined moving vector that defines the moving amount and the moving direction of a feature point between images, the input information determination section 114B performs the following process. Specifically, the input information determination section 114B determines whether or not a moving vector between a plurality of input images acquired from the input section during the reference determination period coincides with the defined moving vector when the input start timing coincides with the reference start timing, and determines whether or not a moving vector between a plurality of input images acquired from the input section during the auxiliary determination period coincides with the defined moving vector when the input start timing coincides with the auxiliary start timing.

The image generation section 120 performs a drawing process based on the results of various processes performed by the processing section 100 to generate an image, and outputs the generated image to the display section 90. For example, the image generation section 120 according to this embodiment generates an image that instructs the reference start timing and the reference determination period.

The image generation section 120 receives object data (model data) including vertex data (e.g., vertex position coordinates, texture coordinates, color data, normal vector, or alpha-value) about each vertex of the object (model), and performs a vertex process (shading using a vertex shader) based on the vertex data included in the received object data. When performing the vertex process, the image generation section 120 may optionally perform a vertex generation process (tessellation, curved surface division, or polygon division) for subdividing the polygon.

In the vertex process, the image generation section 120 performs a vertex movement process and a geometric process such as coordinate transformation (e.g., world coordinate transformation or viewing transformation (camera coordinate transformation), clipping, perspective transformation (projection transformation), and viewport transformation based on a vertex processing program (vertex shader program or first shader program), and changes (updates or adjusts) the vertex data about each vertex that forms the object based on the processing results.

The image generation section 120 then performs a rasterization process (scan conversion) based on the vertex data changed by the vertex process so that the surface of the polygon (primitive) is linked to pixels. The image generation section 120 then performs a pixel process (shading using a pixel shader or a fragment process) that draws the pixels that form the image (fragments that form the display screen). In the pixel process, the image generation section 120 determines the drawing color of each pixel that forms the image by performing various processes such as a texture reading (texture mapping) process, a color data setting/change process, a translucent blending process, and an anti-aliasing process based on a pixel processing program (pixel shader program or second shader program), and outputs (draws) the drawing color of the object subjected to perspective transformation to the image buffer 172 (i.e., a buffer that can store image information in pixel units; VRAM or rendering target). Specifically, the pixel process includes a per-pixel process that sets or changes the image information (e.g., color, normal, luminance, and alpha-value) in pixel units. The image generation section 120 thus generates an image viewed from the virtual camera (given viewpoint) in the object space. When a plurality of virtual cameras (viewpoints) are provided, the image generation section 120 may generate an image so that images (divided images) viewed from the respective virtual cameras are displayed on one screen.

The vertex process and the pixel process are implemented by hardware that enables a programmable polygon (primitive) drawing process (i.e., a programmable shader (vertex shader and pixel shader)) based on a shader program written in shading language. The programmable shader enables a programmable per-vertex process and a per-pixel process so that the degree of freedom of the drawing process increases, and the representation capability can be significantly improved as compared with a fixed drawing process using hardware.

The image generation section 120 performs a geometric process, texture mapping, hidden surface removal, alpha-blending, and the like when drawing the object.

In the geometric process, the image generation section 120 subjects the object to coordinate transformation, clipping, perspective projection transformation, light source calculation, and the like. The object data (e.g. object's vertex position coordinates, texture coordinates, color data (luminance data), normal vector, or alpha-value) after the geometric process (after perspective transformation) is stored in the storage section 170.

The term "texture mapping" refers to a process that maps a texture (texel value) stored in the storage section 170 onto the object. Specifically, the image generation section 120 reads a texture (surface properties such as color (RGB) and alpha-value) from the storage section 170 using the texture coordinates set (assigned) to the vertices of the object, and the like. The image generation section 120 maps the texture (two-dimensional image) onto the object. In this case, the image generation section 120 performs a pixel-texel link process, a bilinear interpolation process (texel interpolation process), and the like.

The image generation section 120 may perform a hidden surface removal process by a Z-buffer method (depth comparison method or Z-test) using a Z-buffer (depth buffer) that stores the Z-value (depth information) of the drawing pixel. Specifically, the image generation section 120 refers to the Z-value stored in the Z-buffer when drawing the drawing pixel corresponding to the primitive of the object. The image generation section 120 compares the Z-value stored in the Z-buffer with the Z-value of the drawing pixel of the primitive. When the Z-value of the drawing pixel is a Z-value in front of the virtual camera (e.g., a small Z-value), the image generation section 120 draws the drawing pixel, and updates the Z-value stored in the Z-buffer with a new Z-value.

The term "alpha-blending" refers to a translucent blending process (e.g., normal alpha-blending, additive alpha-blending, or subtractive alpha-blending) based on the alpha-value (A value).

For example, the image generation section 120 performs a linear synthesis process on a drawing color (color to be over-written) C1 that is to be drawn in the image buffer 172 and a drawing color (basic color) C2 that has been drawn in the image buffer 172 (rendering target) based on the alpha-value. Specifically, the final drawing color C can be calculated by "C=C1*alpha+C2*(1−alpha).

Note that the alpha-value is information that can be stored corresponding to each pixel (texel or dot), such as additional information other than the color information. The alpha-value may be used as mask information, translucency (equivalent to transparency or opacity), bump information, or the like.

The sound control section 130 performs a sound process based on the results of various processes performed by the processing section 100 to generate game sound (e.g., background music (BUM), effect sound, or voice), and outputs the generated game sound to the speaker 92.

The terminal according to this embodiment may be controlled so that only one player can play the game (single-player mode), or a plurality of players can play the game (multi-player mode). In the multi-player mode, the terminal may exchange data with anther terminal through a network, and perform the game process, or a single terminal may perform the process based on the input information received from a plurality of input sections, for example.

The information storage medium 180 (computer-readable medium) stores a program, data, and the like. The function of the information storage medium 180 may be implemented by hardware such as an optical disk (CD or DVD), a magneto-optical disk (MO), a magnetic disk, a hard disk, a magnetic tape, or a memory (ROM).

The display section 90 outputs an image generated by the processing section 100. The function of the display section 90 may be implemented by hardware such as a CRT display, a liquid crystal display (LCD), an organic EL display (OELD), a plasma display panel (PDP), a touch panel display, or a head mount display (HMD).

The speaker 92 outputs sound reproduced by the sound control section 130. The function of the speaker 92 may be implemented by hardware such as a speaker or a headphone. The speaker 92 may be a speaker provided in the display section. For example, when a television set (home television set) is used as the display section, the speaker 92 may be a speaker provided in the television set.

1-3. Outline of First Embodiment

Figure 5:
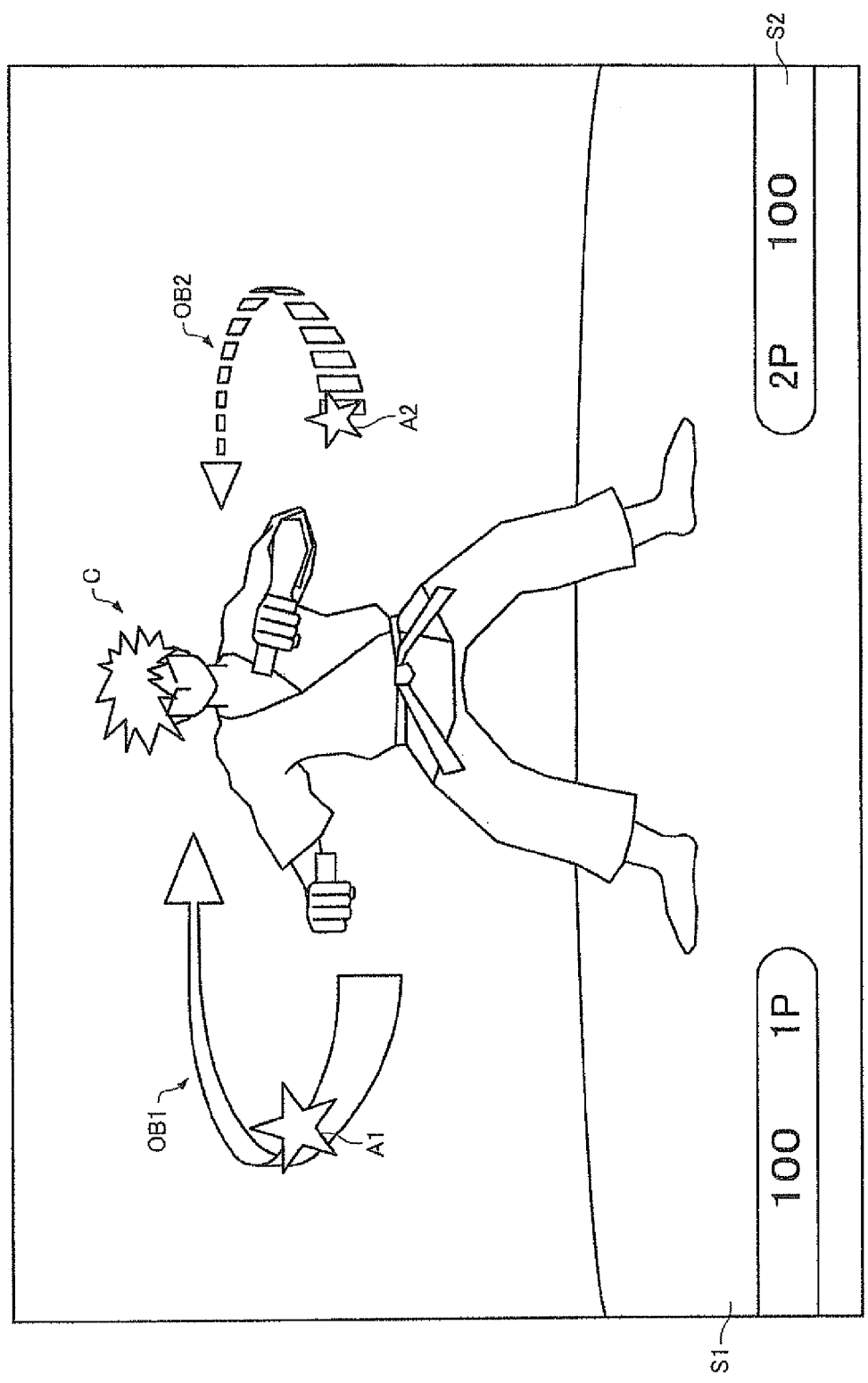
FIG. 5 is a diagram illustrating an example of a game screen.

In the first embodiment, an image including an instruction object OB1 that instructs a Karate movement is displayed on the display section 90, as illustrated in FIG. 5. Specifically, the instruction object OB1 is an object that instructs the moving state (movement) of the controller 20 in the real space for the player who holds the controller 20.

The player performs fitness exercise as if to perform a Karate technique by moving the controllers 20A and 20B held with either hand in the real space while watching the instruction image displayed on the display section 90.

In this embodiment, the input determination process is performed on each Karate movement (e.g., half turn of the left arm) (unit), and a plurality of Karate movements are defined in advance. A reference determination period is set for each movement (e.g., half turn of the left arm), and whether or not the input start timing coincides with the start timing (reference start timing) of the reference determination period, whether or not a movement specified by the input information that has been input during the reference determination period coincides with a given movement (e.g., half turn of the left arm), and whether or not the input end timing coincides with the end timing (reference end timing) of the reference determination period are determined.

As illustrated in FIG. 5, a character C that holds controllers with either hand is displayed within the game screen, and performs a model Karate movement. An image including the instruction object OB1 that instructs the moving state (movement) of the controller 20 held by the player is generated with the progress of the game. The instruction object is displayed so that the moving path is indicated by a line, the moving direction is indicated by an arrow, and the moving speed during the reference determination period is indicated by a moving timing mark A1. In the example illustrated in FIG. 5, the instruction object OB1 and the moving timing mark A1 instructs the player to half-turn his left arm.

In this embodiment, the input determination process is sequentially performed on the Karate movement with the lapse of time. As illustrated in FIG. 5, an image including an advance instruction object OB2 that indicates the next movement is generated and displayed before the reference start timing.

The character C is disposed in the virtual three-dimensional space, and an image viewed from the virtual camera is generated. The two-dimensional instruction object OB1, advance instruction object OB2, and moving timing marks A1 and A2 are synthesized with the generated image to generate a display image.

1-4. Details of Input Determination Process

The game machine 10 according to this embodiment acquires accelerations detected by the acceleration sensor 210 of the controller 20 as the input information, and performs the input determination process (input evaluation process) based on the input information. Specifically, the game machine 10 determines whether or not the player has performed the Karate movement instructed by the image. The details of the input determination process according to this embodiment are described below.

In the example illustrated in FIG. 5, the instruction object corresponding to the input determination process performed on the controller 20A held with the right hand is displayed on the right area, and the instruction object corresponding to the input determination process performed on the controller 2013 held with the left hand is displayed on the left area. Specifically, the input determination process is performed on each controller 20. Note that the input determination process performed on one controller 20 is described below for convenience.

1-4-1. Determination of Timing

In this embodiment, when the reference start timing has been reached, whether or not the input start timing coincides with the reference start timing is determined based on the acceleration vector acquired from the controller 20.

Figure 6:
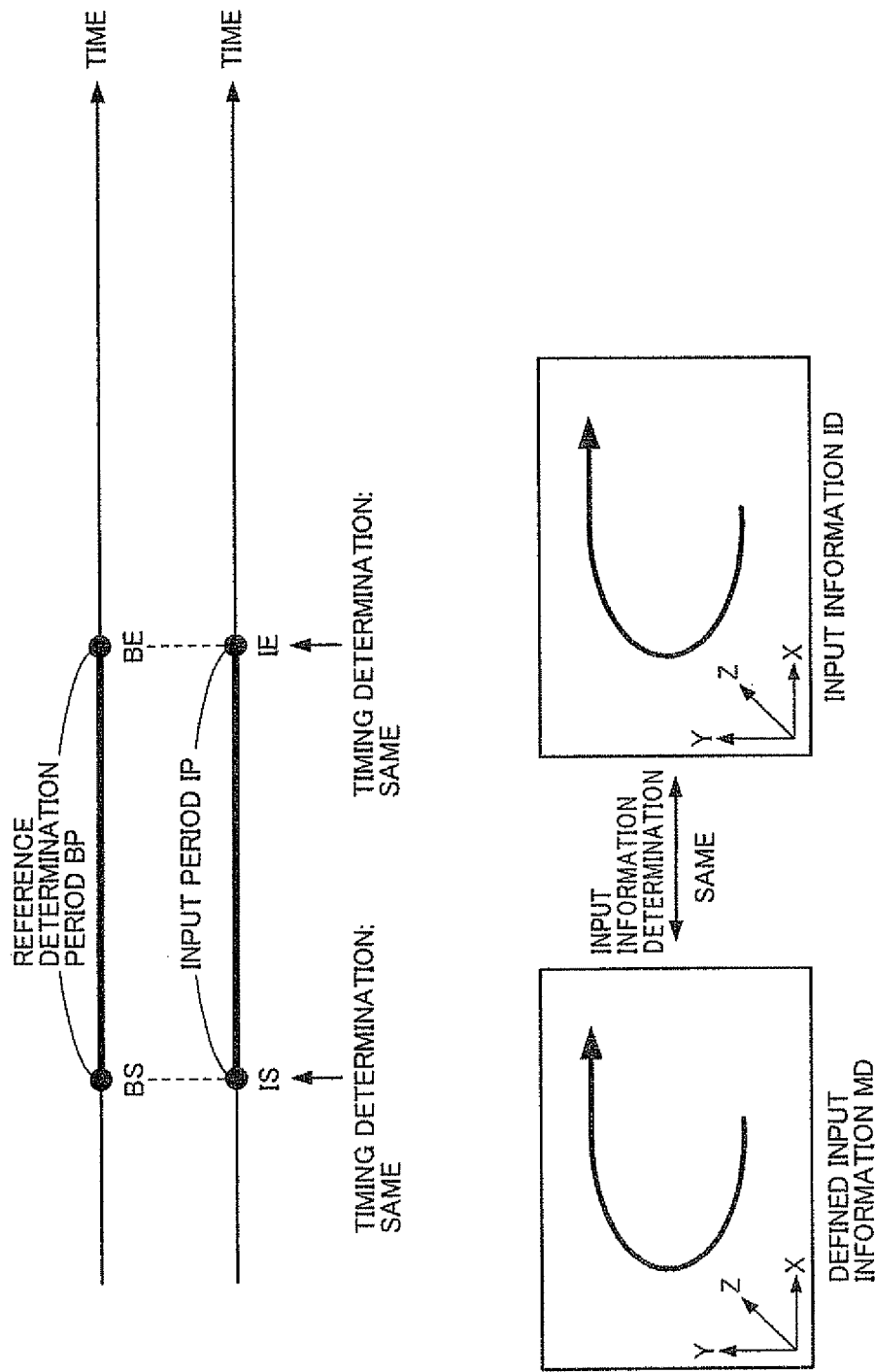
FIG. 6 is a diagram illustrating an input determination process according to one embodiment of the invention.

As illustrated in FIG. 6, x, y, and z-axis accelerations detected by the acceleration sensor are acquired in a predetermined cycle, for example.

The x, y, and z-axis accelerations acquired at a reference start timing BS are compared with the accelerations (acceleration range) corresponding to the reference start timing BS to determine whether or not the input start timing coincides with the reference start timing.

For example, when the x, y, and z-axis accelerations acquired at the reference start timing BS coincide with the accelerations corresponding to the reference start timing BS, it is determined that the input start timing coincides with the reference start timing. When the x, y, and z-axis accelerations acquired at the reference start timing BS differ from the accelerations corresponding to the reference start timing BS, it is determined that the input start timing does not coincide with the reference start timing.

Likewise, whether or not an input end timing IE coincides with a reference end timing BE is also determined.

1-4-2. Determination of Input Information

As illustrated in FIG. 6, when the input start timing IS coincides with the reference start timing BS of the reference determination period BP, whether or not input information ID that has been input during the reference determination period BP coincides with defined input information MD is determined. Specifically, whether or not the moving state (movement) of the controller that has been moved by the player coincides with the moving state displayed on the screen is determined. The defined input information MD is a set of x, y, and z-axis accelerations (defined acceleration group) that should be input with the lapse of time during the reference determination period BP.

In this embodiment, an acceleration group including x, y, and z-axis accelerations detected by the acceleration sensor in a predetermined cycle (every frame) during the reference determination period BP is compared with the acceleration group included in the defined input information to determine whether or not the input information that has been input during the reference determination period BP coincides with the defined input information.

For example, when it has been determined that 60% or more of the accelerations detected by the acceleration sensor during the reference determination period BP coincide with the accelerations included in the defined input information MD, it may be determined that the input information that has been input during the reference determination period BP coincides with the defined input information.

1-4-3. Auxiliary Start Timing

Figure 7:
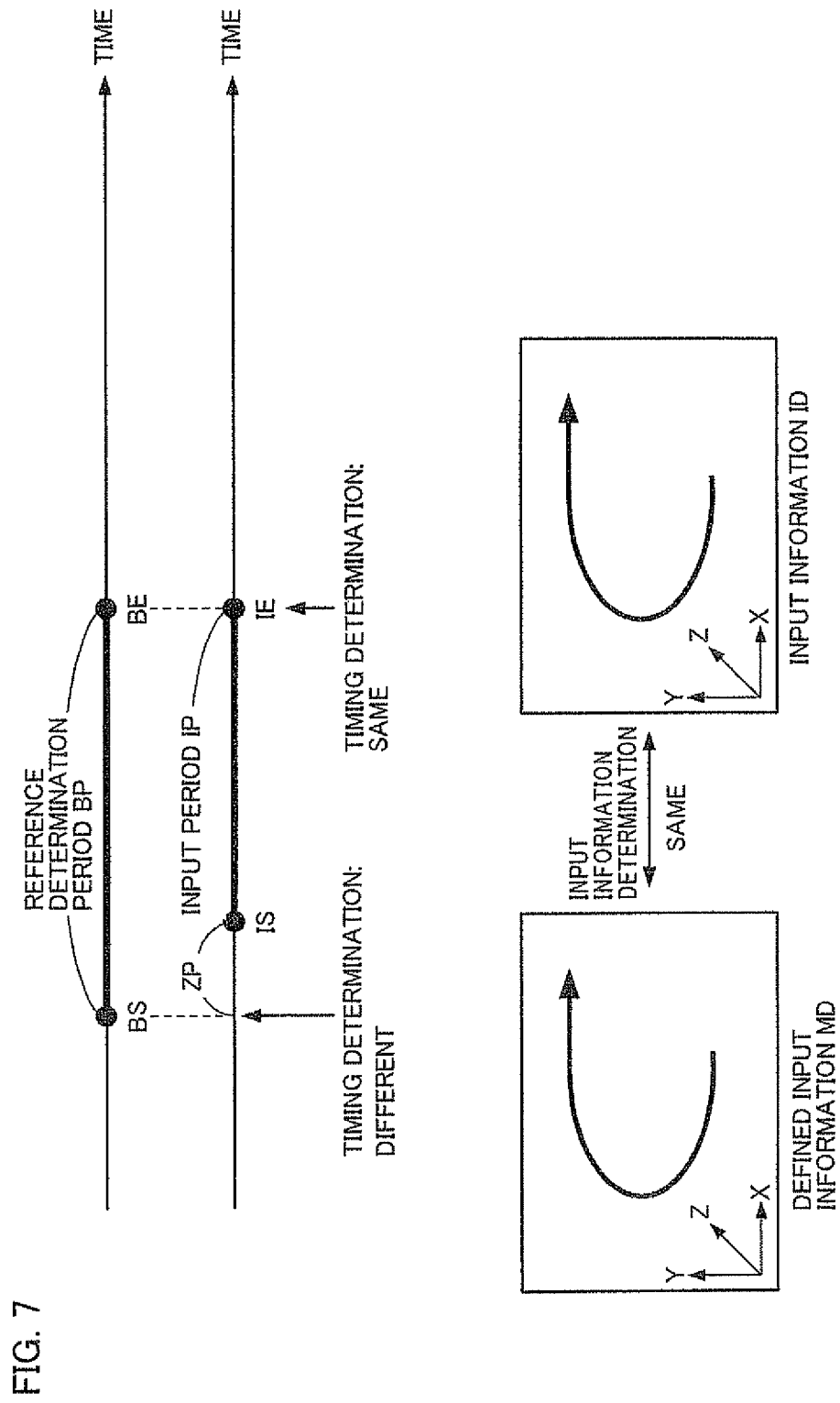
FIG. 7 is a diagram illustrating an input determination process according to one embodiment of the invention.

As illustrated in FIG. 7, when the player has delayed moving the controller 20, the input start timing IS differs from the reference start timing BS by a narrow margin, so that it may be determined that the input start timing IS does not coincide with the reference start timing BS. Likewise, when the player has prematurely moved the controller 20, it may be determined that the input start timing IS does not coincide with the reference start timing BS.

Figure 8:
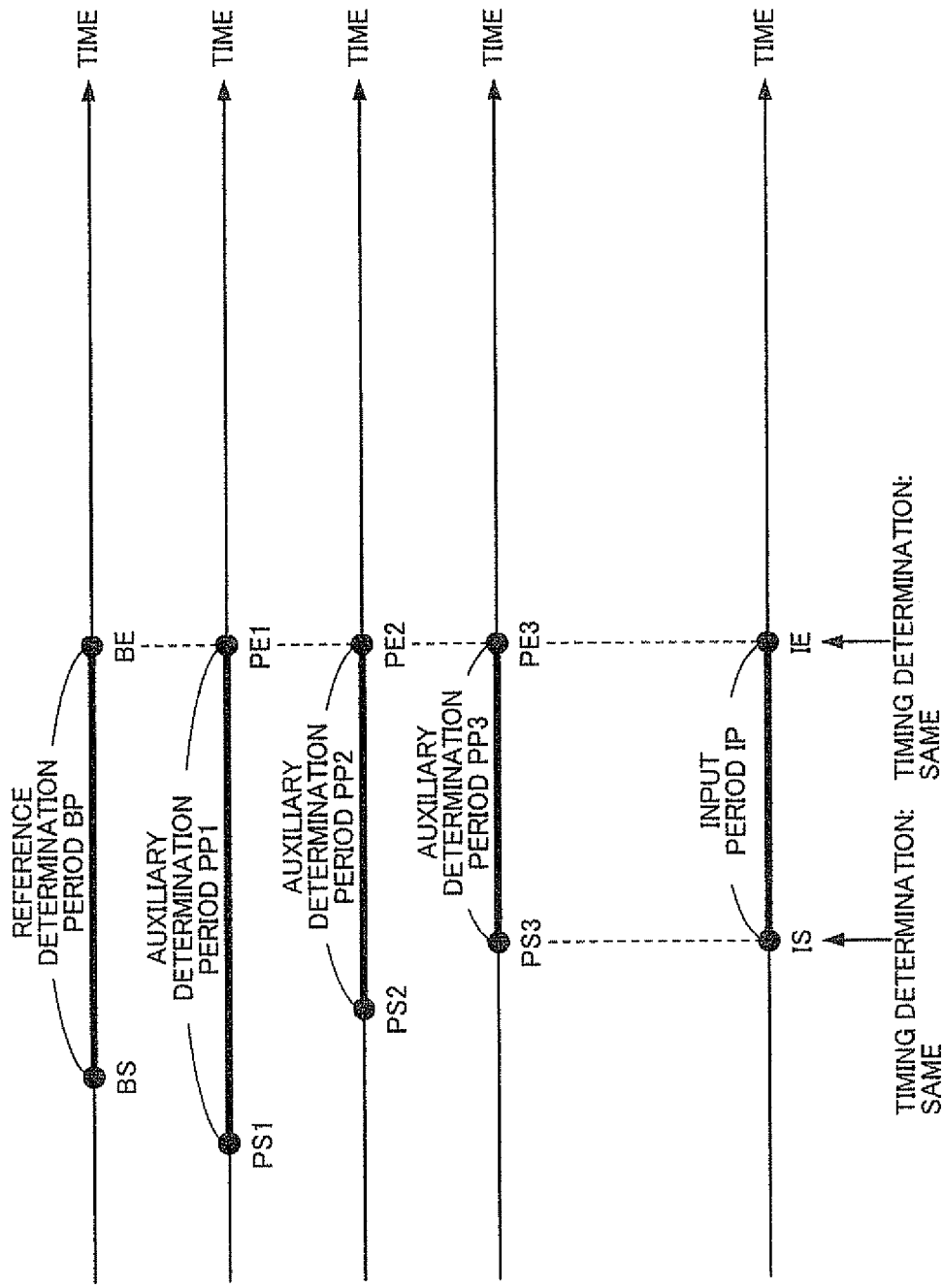
FIG. 8 is a diagram illustrating an input determination process according to one embodiment of the invention.

In this case, the player may find it difficult to adjust the input timing to the reference start timing, and may be frustrated. In order to solve this problem, a plurality of auxiliary start timings PS1, PS2, and PS3 corresponding to the reference start timing BS are provided, as illustrated in FIG. 8. It is determined that the start timings coincide when the input start timing IS coincides with the auxiliary start timing PS1, PS2, or PS3 even if the input start timing IS does not coincide with the reference start timing BS.

Specifically, the reference determination period BP and a plurality of auxiliary determination periods PP1, PP2, and PP3 are defined for a single movement (e.g., half turn of the left arm). Whether or not the input start timing IS coincides with the reference start timing BS of the reference determination period BP, the auxiliary start timing PS1 of the auxiliary determination period PP1, the auxiliary start timing PS2 of the auxiliary determination period PP2, or the auxiliary start timing PS3 of the auxiliary determination period PP3 is determined. When the input start timing IS coincides with one of the timings (BS, PS1, PS2, PS3), whether or not the input information ID that has been input during a period from the input start timing IS to the input end timing IE coincides with the defined input information MD is determined.

As illustrated in FIG. 8, when the input start timing IS coincides with the auxiliary start timing PS3 of the auxiliary determination period PP3 as a result of the input determination process performed on a single movement, it is determined that the start timings coincide even if the input start timing IS does not coincide with the reference start timing BS.

This makes it possible to flexibly determine the input start timing even if the player has delayed moving the controller 20, or has prematurely moved the controller 20.

Figure 9:
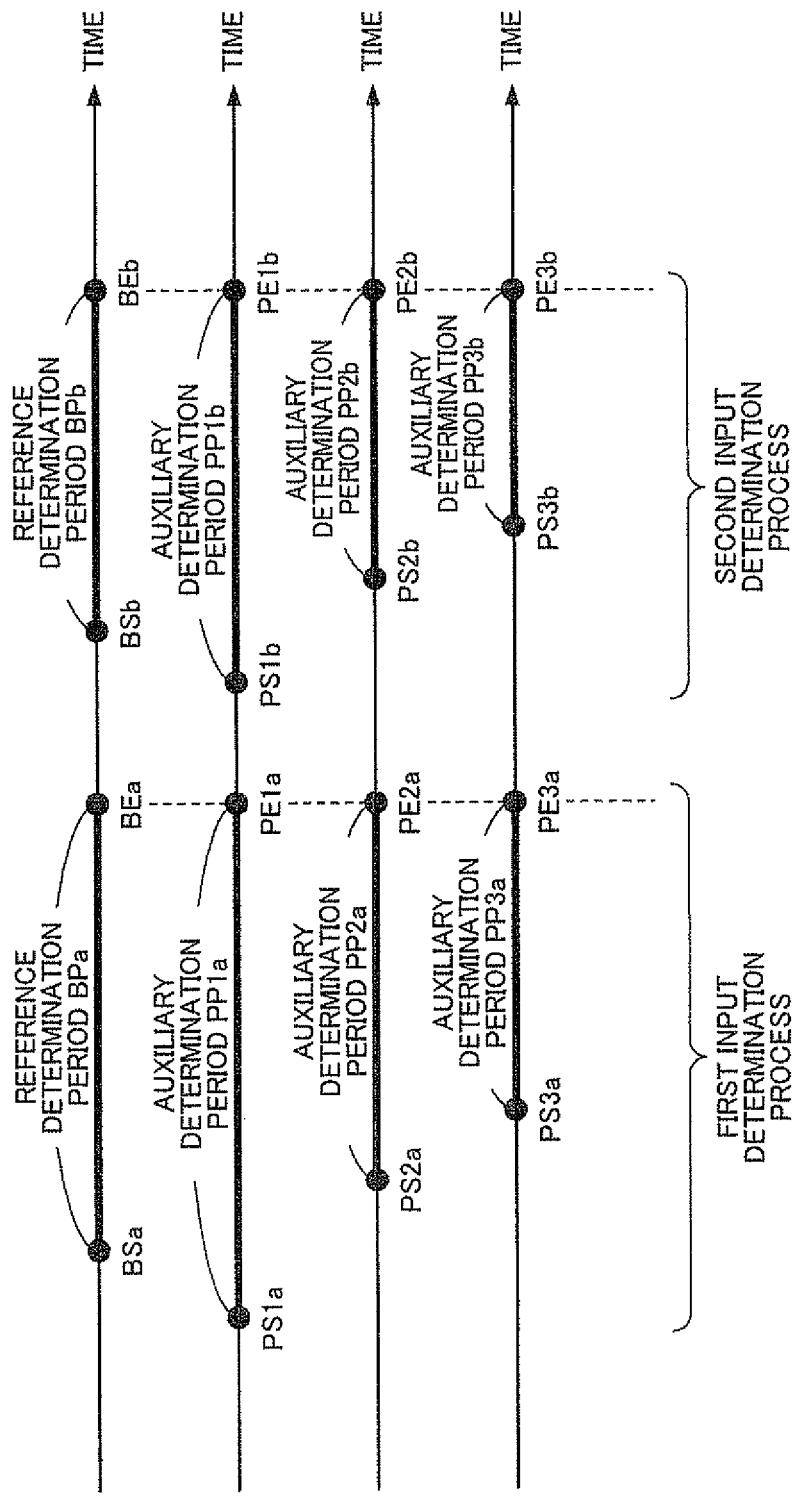
FIG. 9 is a diagram illustrating an input determination process according to one embodiment of the invention.

In this embodiment, since the input determination process is performed on a plurality of movements, it is necessary to prevent a situation in which the auxiliary determination period affects another input determination process. Therefore, as illustrated in FIG. 9, auxiliary end timings PE1a, PE2a, and PE3a of auxiliary determination periods PP1a, PP2a, and PP3a corresponding to a reference determination period BPa of the first input determination process are set to an end timing BEa of the reference determination period BPa. Note that the auxiliary end timings PE1a, PE2a, and PE3a need not necessarily be set to the end timing BEa of the reference determination period BPa.

For example, it suffices that the auxiliary end timings PE1a, PE2a, and PE3a occur before a start timing BSb of a reference determination period BPb of the second input determination process and auxiliary start timings PS1b, PS2b, and PS3b corresponding to the reference determination period BPb.

Specifically, it suffices that the auxiliary start timings PS1b, PS2b, and PS3b occur after the end timing BEa of the reference determination period BPa of the first input determination process and the auxiliary end timings PE1a, PE2a, and PE3a corresponding to the reference determination period BPa.

This prevents a situation in which one input determination process affects another input determination process.

Note that the reference start/end timing, the auxiliary start/end timing, the reference determination period, and the auxiliary determination period are defined by the elapsed time from the music data reproduction start time. For example, the reference start/end timing, the auxiliary start/end timing, the reference determination period, and the auxiliary determination period are defined by the elapsed time provided that the music data reproduction start time is "0".

Note that the differential period between the reference start timing and the input start timing may be measured in advance, and the auxiliary start timing and the auxiliary determination period may be set based on the differential period. For example, a differential period ZP between the reference start timing BS and the input start timing IS is acquired, as illustrated in FIG. 7. A timing that differs from the reference start timing BS by the period ZP is set as a start timing PS of an auxiliary determination period PP. The auxiliary start timing can be set taking account of the tendency of the player and the like by setting the start timing PS and the auxiliary determination period PP based on the differential period ZP.

Note that an auxiliary determination period corresponding to each of a plurality of reference determination periods may be set based on the period ZP.

1-4-4. A Plurality of Pieces of Defined Input Information

Figure 10A:
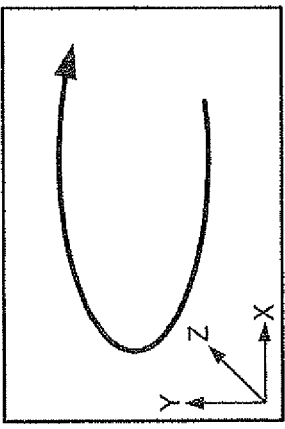
FIGS. 10A to 10C are diagrams illustrating defined input information according to one embodiment of the invention.
Figure 10B:
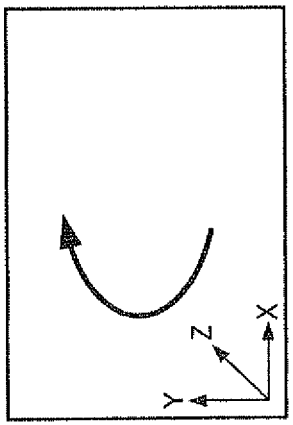
Figure 10C:
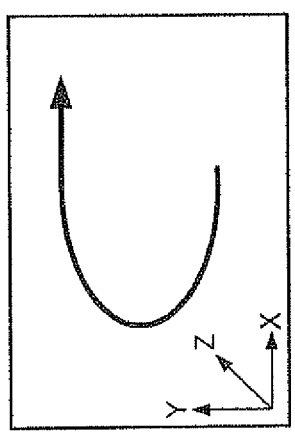

As illustrated in FIGS. 10A to 10C, a plurality of pieces of defined input information MD1, MD2, and MD3 may be defined in advance for each input determination process. This increases the possibility that the input information is determined to coincide with the defined input information.

1-4-5. Determination Information

As illustrated in FIG. 11, the reference determination period (reference start/end timing), an auxiliary determination period 1 (auxiliary start/end timing), an auxiliary determination period 2 (auxiliary start/end timing), an auxiliary determination period 3 (auxiliary start/end timing), and the defined input information are stored (managed) in the determination information storage section 173 corresponding to the ID of each input determination process.

For example, when performing the input determination process having an ID of 1, whether or not the input start timing coincides with the reference start timing BSa, the auxiliary start timing PS1a, the auxiliary start timing PS2a, or the auxiliary start timing PS3a is determined. When the input start timing coincides with the reference start timing BSa, the auxiliary start timing PS1a, the auxiliary start timing PS2a, or the auxiliary start timing PS3a, whether or not the input information that has been input during the determination period that starts from that input start timing coincides with defined input information MD1a, MD2a, or MD3a is determined.

This increases the probability that the start timings are determined to coincide, and the input information is determined to coincide with the defined input information, so that an input determination process that satisfies the player can be implemented.

1-4-6. Image Generation Process

As illustrated in FIG. 5, the image generation section 120 according to this embodiment generates an image including the instruction object OB1 and the moving timing mark A1 that indicate instructions corresponding to the defined input information MD1 about the controller 20 held by the player based on with the progress of the game.

Figure 12:
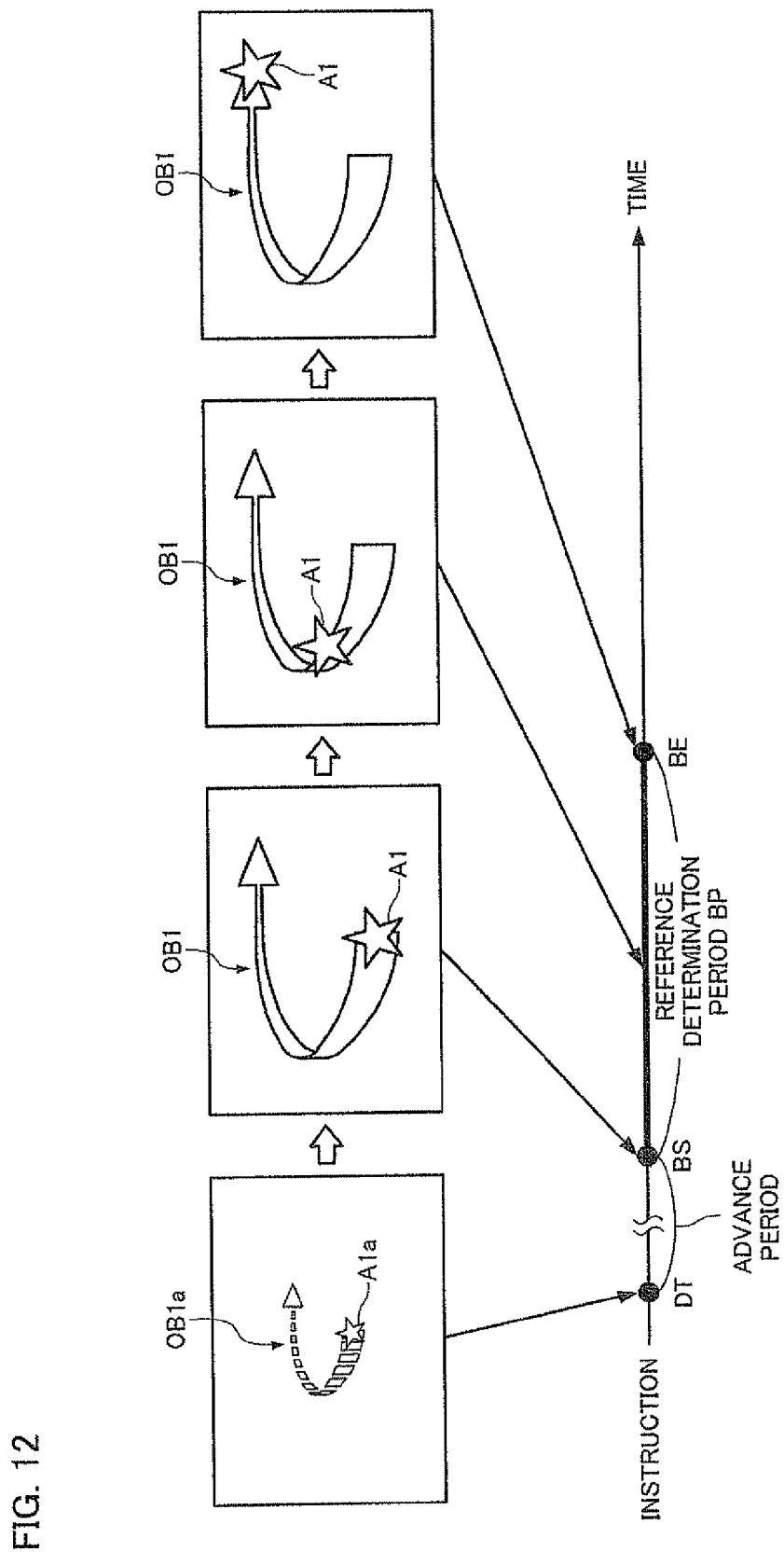
FIG. 12 is a diagram illustrating determination information according to one embodiment of the invention.

As illustrated in FIG. 12, the instruction object OB1 is controlled so that the moving timing mark A1 is positioned at the start position (one end) of the moving path at the reference start timing BS of the reference determination period BP, for example. The instruction object OB1 is controlled so that the moving timing mark A1 moves in the moving direction along the moving path during the reference determination period BP, and is positioned at the finish position (the other end) of the moving path at the reference end timing BE. Specifically, the instruction object OB1 is controlled so that the moving timing mark A1 moves in the moving direction along the moving path during a period from the reference start timing BS to the reference end timing BE.

Therefore, the player can determine the reference start timing BS and the reference end timing BE of the reference determination period BP. Moreover, the player can determine the moving path and the moving direction of the controller 20 corresponding to the defined input information MD1 during the reference determination period BP.

Note that the character C may also be moved based on the defined input information MD (i.e., the moving path of the instruction object OB1).

1-5. Scaling of Object

In this embodiment, the object is scaled up/down with the lapse of time so that the instructions indicated by the object can be easily observed.

1-5-1. Scaling During Advance Period

Figure 13:
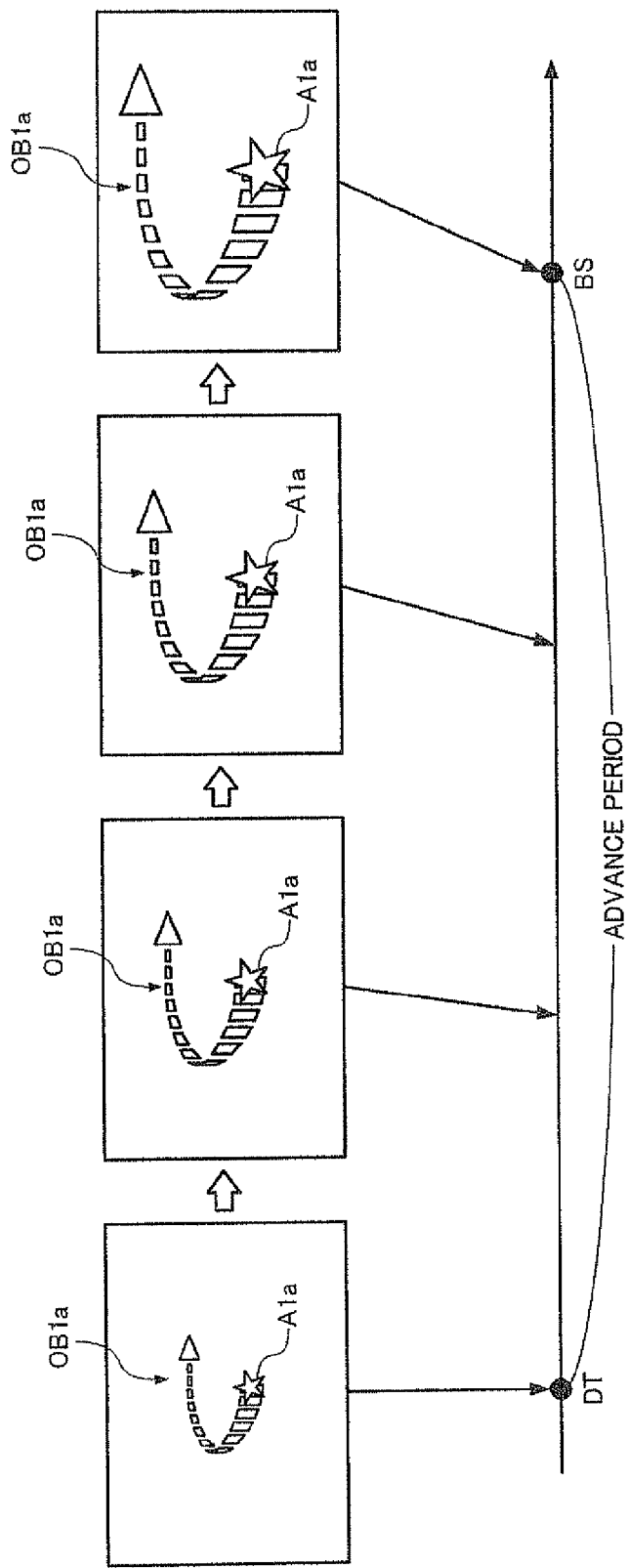
FIG. 13 is a diagram illustrating generation of an image including an object according to one embodiment of the invention.

As illustrated in FIG. 13, an advance period (i.e., a period from DT to BS) is defined before the reference determination period BP, and an image including an advance instruction object OB1a is generated before the reference start timing. When the reference start timing BS has been reached, the instruction object is switched from the advance instruction object OB1a to the instruction object OB1. This makes it possible for the player to determine the reference start timing and the next moving path in advance. Since the input start timing corresponds to the timing when the instruction object is switched from the advance instruction object OB1a to the instruction object OB1, the player can easily determine the input start timing.

As illustrated in FIG. 13, the advance instruction object OB1a may be scaled up (enlarged) with the lapse of time during the advance period. For example, when the scaling factor of the previously modeled advance instruction object OB1a is 1, the scaling factor is changed with the lapse of time so that the size of the advance instruction object OB1a is smaller than that of the previously modeled advance instruction object OB1a by a factor of 0.5 at the start timing DT of the advance period, and becomes equal to that of the previously modeled advance instruction object OB1a at the end timing (reference start timing) BS of the advance period.

The advance instruction object OB1a is scaled up based on the scaling factor that changes with the lapse of time. Therefore, since the timing when the size of the advance instruction object OB1a becomes a maximum corresponds to the input start timing, the player can instantaneously determine the input start timing. Note that an advance moving timing mark A1a may also be scaled up/down based on the scaling factor of the advance instruction object OB1a.

1-5-2. Scaling During Determination Period

Figure 14:
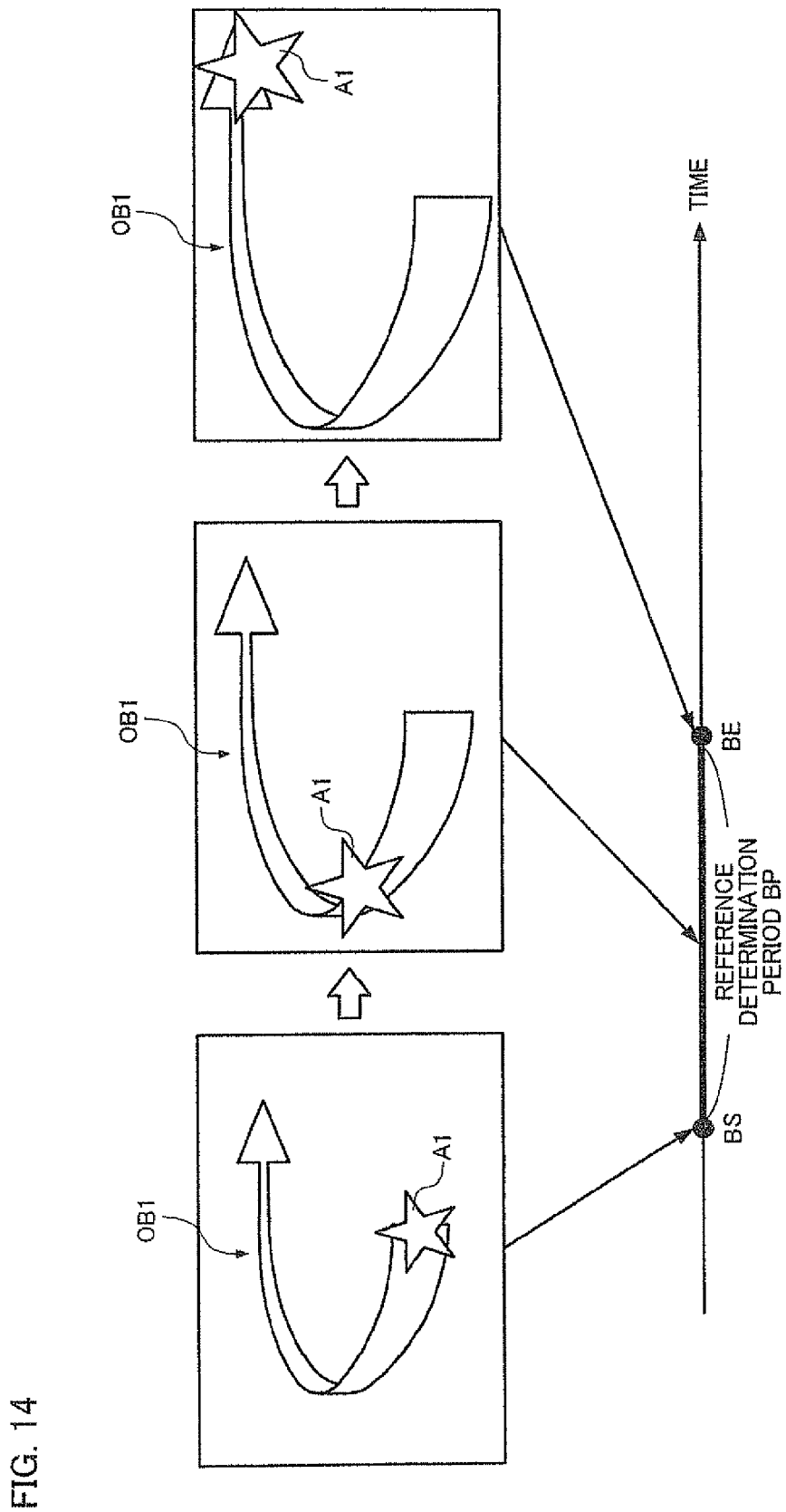
FIG. 14 is a diagram illustrating generation of an image including an object according to one embodiment of the invention.
Figure 15:
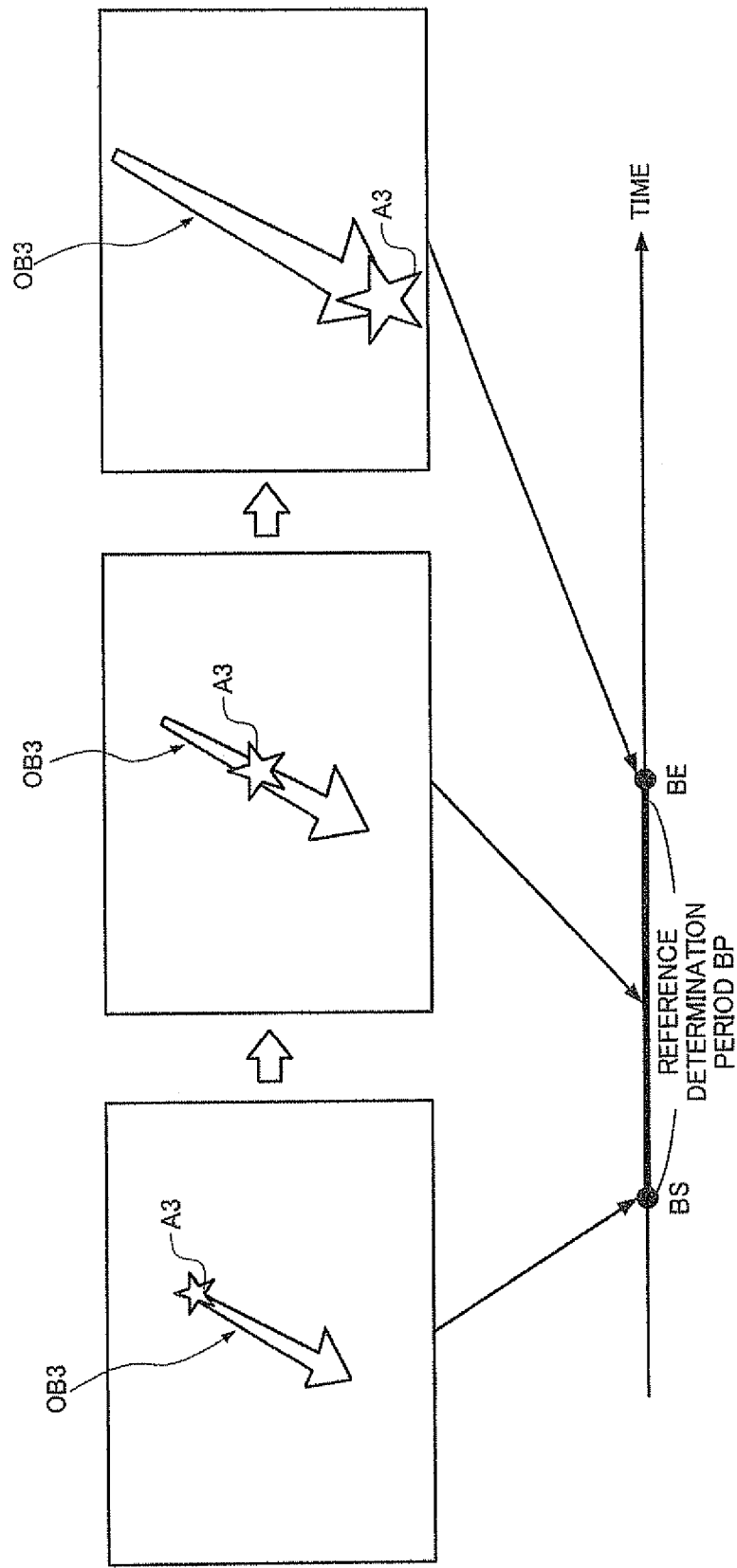
FIG. 15 is a diagram illustrating generation of an image including an object according to one embodiment of the invention.

As illustrated in FIG. 14, the instruction object OB1 may be scaled up (enlarged) with the lapse of time during the reference determination period BP. For example, when the scaling factor of the previously modeled instruction object OB1 is 1, the scaling factor is changed with the lapse of time so that the size of the instruction object OB1 is equal to that of the previously modeled instruction object OB1 at the reference start timing BS, and becomes larger than that of the previously modeled instruction object OB1 by a factor of 1.5 at the reference end timing BE. The instruction object OB1 is scaled up based on the scaling factor that changes with the lapse of time. Note that the moving timing mark A1 may also be scaled up/down based on the scaling factor of the instruction object OB1. This makes it possible for the player to easily determine an operation (movement) that should be input during the reference determination period FIG. 15 illustrates an example of an instruction object OB3 and a moving timing mark A3 that instruct a movement (e.g., forward movement) in the depth direction (Z direction) in the real space. As illustrated in FIG. 15, the scaling factor of the instruction object OB3 and the moving timing mark A3 is increased from 1 to 1.5 with the lapse of time during the reference determination period BP, for example. The instruction object OB3 and the moving timing mark A3 are scaled up based on the scale factor that changes with the lapse of time during the reference determination period BP. Therefore, since the instructions in the depth direction can be more effectively displayed (represented), the player can easily determine the movement in the depth direction.

In this embodiment, the instruction object is a two-dimensional object, but may be a three-dimensional object.

For example, when generating an image in which an instruction object that instructs a movement (e.g., forward movement) in the depth direction with respect to the virtual camera is disposed in the virtual three-dimensional space, the instruction object having a scaling factor of 1 is disposed at the reference start timing BS of the reference determination period BP. The scaling factor is increased with the lapse of time during the reference determination period BP, and the instruction object is scaled up based on the scaling factor that has been increased. The instruction object is scaled up at a scaling factor of 1.5 at the end timing BE of the reference determination period BP. Therefore, since the instructions in the depth direction can be more effectively displayed (represented) when instructing the movement in the view direction (depth direction) of the virtual camera, the player can easily determine the movement in the depth direction.

1-6. Flow of Input Determination Process

Figure 16:
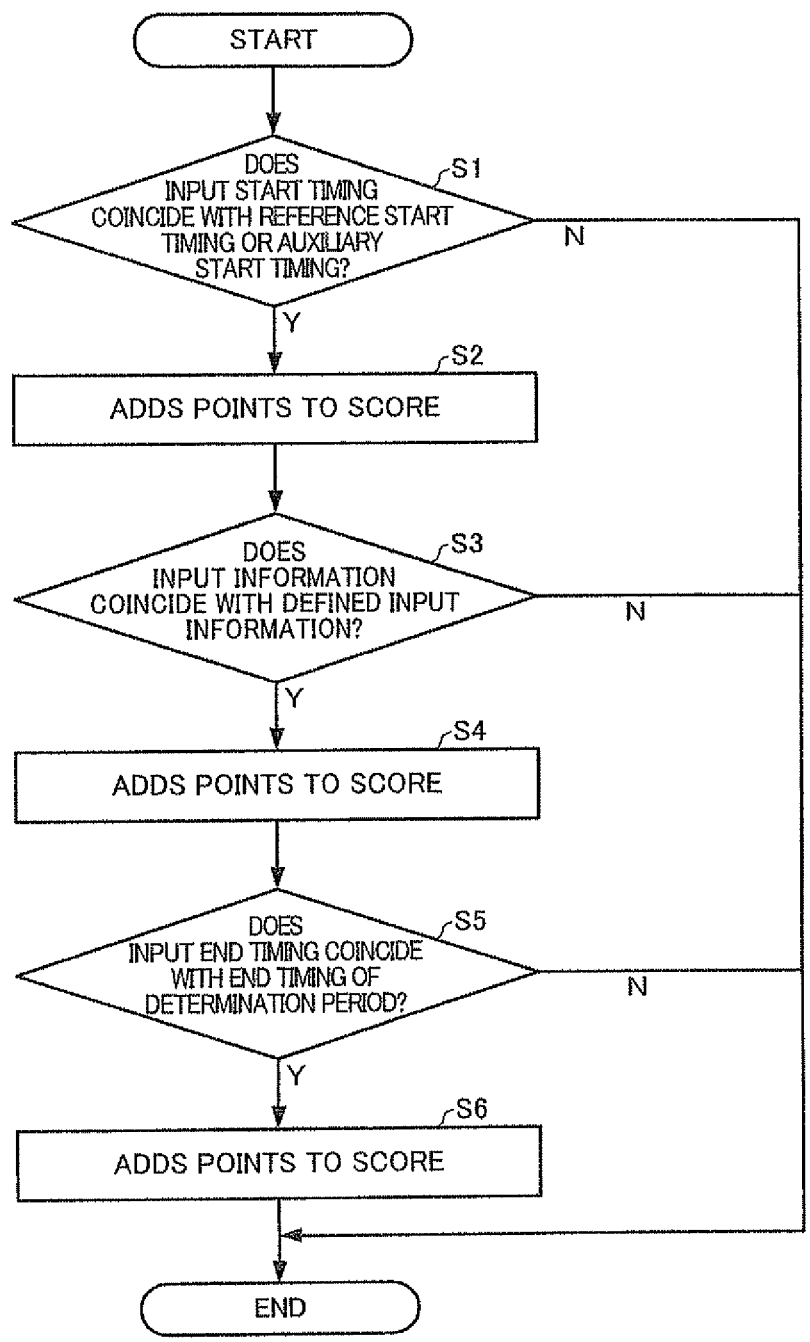
FIG. 16 is a flowchart according to one embodiment of the invention.

The flow of the input determination process according to this embodiment that is performed on a single movement is described below with reference to FIG. 16. First, whether or not the input start timing coincides with the reference start timing or the auxiliary start timing is determined (step S1). Taking FIG. 8 as an example, whether or not the input start timing using the input section coincides with the auxiliary start timing PS1, the reference start timing BS, the auxiliary start timing PS2, or the auxiliary start timing PS3 is determined with the lapse of time.

When the input start timing coincides with the reference start timing (Y in step S1), points are added to the score of the player (step S2).

Whether or not the input information coincides with the defined input information is then determined (step S3). For example, it is determined that the input information coincides with the defined input information when the input information coincides with one of the plurality of pieces of defined input information. MD1, MD2, and MD3.

Note that the input information that has been input during the determination period that starts from the timing determined to coincide with the reference start timing BS, the auxiliary start timing PS1, the auxiliary start timing PS2, or the auxiliary start timing PS3 is compared with the plurality of pieces of defined input information MD1, MD2, and MD3. Taking FIG. 8 as an example, since it is determined that the input start timing IS coincides with the auxiliary start timing PS3, the input information that has been input during the auxiliary determination period PP3 is compared with the plurality of pieces of defined input information MD1, MD2, and MD3.

When it has been determined that the input information coincides with the defined input information (Y in step S3), points are added to the score of the player (step S4).

Whether or not the input end timing coincides with the end timing of the determination period is then determined (step S5). Taking FIG. 8 as an example, since the determination period is the auxiliary period PP3, whether or not the input end timing IE coincides with the auxiliary end timing PE3 is determined.

When it has been determined that the input end timing coincides with the end timing of the determination period (Y in step S5), points are added to the score of the player (step S6).

1-7. Application Example (1) In this embodiment, the input determination process may be performed based on a signal input from the controller 20 when the arrow key 271 or the button 272 has been operated. For example, when detection of a predetermined combination of signals (e.g., signals generated when the arrow key has been operated upward, downward, rightward, and rightward) during the reference determination period has been defined as the defined input information, whether or not the first signal (up) has been input at the reference start timing, whether or not a signal corresponding to the defined input information has been input during the reference determination period before the reference end timing is reached, and whether or not the last signal (right) has been input at the reference end timing may be determined.

(2) This embodiment may be applied to a touch panel display that includes a touch panel for detecting the contact position of the player, a pointing device, or the like used as the input section. Specifically, a defined moving path that should be input during the determination period (reference determination period or auxiliary determination period) may be used as the defined input information.

A two-dimensional moving path detected by a touch panel display, a pointing device, or the like may be used as the input information, and whether or not the moving path detected from the input section during the reference determination period coincides with the defined moving path may be determined when the input start timing coincides with the reference start timing. Alternatively, whether or not the moving path detected from the input section during the reference determination period coincides with the defined moving path may be determined when the input start timing coincides with the auxiliary start timing.

2. Second Embodiment

A second embodiment of the invention is described below. The second embodiment is configured by applying the first embodiment. The following description focuses on the differences from the first embodiment, additional features of the second embodiment, and the like, and description of the same features as those of the first embodiment is omitted.

2-1. Second Game System

Figure 17:
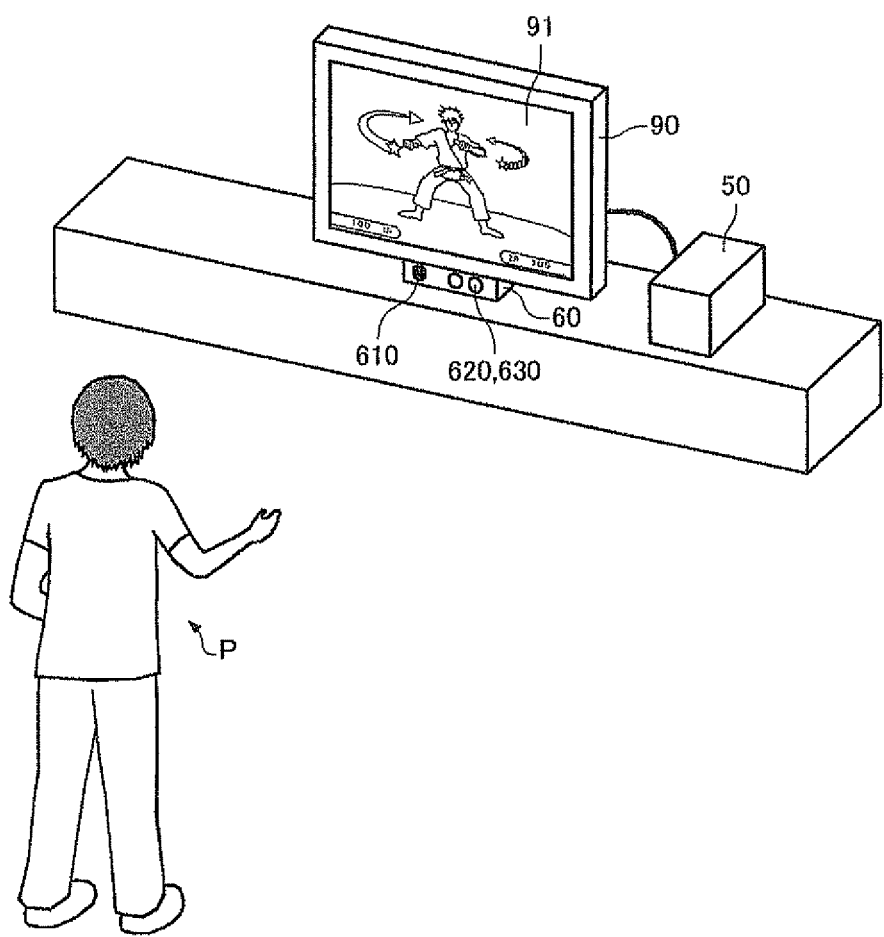
FIG. 17 is a diagram illustrating a second game system according to one embodiment of the invention.

FIG. 17 is a schematic external view illustrating a second game system (second image generation system or second input determination system) according to the second embodiment. The second game system according to this embodiment includes a display section 90 that displays a game image, a game machine 50 (game machine main body) that performs a game process and the like, and an input section 60. As illustrated in FIG. 17, the input section 60 is disposed around the display section 90 (display screen 91) at a given position with respect to the display section 90 (display screen 91). For example, the input section 60 may be disposed under or over the display section 90 (display screen 91).

The second game system includes the input section 60 (i.e., sensor) that recognizes the movement of the hand or the body of a player P. The input section 60 includes a light-emitting section 610, a depth sensor 620, an RGB camera 630, and a sound input section 640 (multiarray microphone). The input section 60 determines (acquires) the three-dimensional position of the hand or the body of the player P in the real space and shape information without coming in contact with the player P (body). An example of a process performed by the second game system using the input section 60 is described below.

2-2. Configuration

Figure 18:
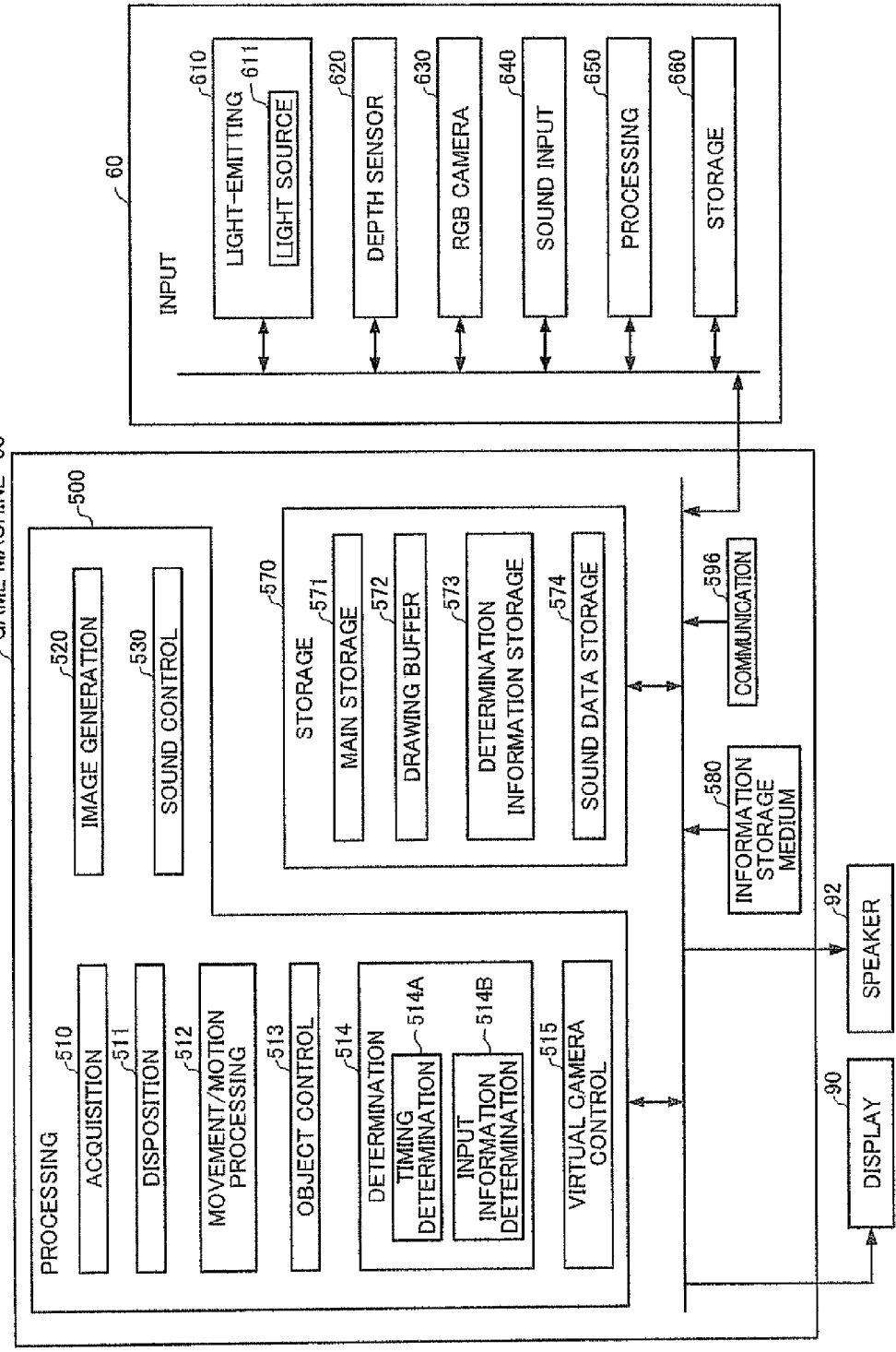
FIG. 18 is a functional block diagram illustrating a second game system according to one embodiment of the invention.

FIG. 18 illustrates an example of a functional block diagram of the second game system. The following description focuses on the differences from the configuration example of the first game system, and description of the same features as those of the configuration example of the first game system is omitted. Note that the second game system need not necessarily include all of the sections illustrated in FIG. 18. The second game system may have a configuration in which some of the sections illustrated in FIG. 18 are omitted.

The second game system includes the game machine 50, the input section 60, the display section 90, and a speaker 92.

The input section 60 includes the light-emitting section 610, the depth sensor 620, the RGB camera 630, the sound input section 640, a processing section 650, and a storage section 660.

The light-emitting section 610 applies (emits) light to a body (player or object). For example, the light-emitting section 610 includes a light-emitting element (e.g., LED), and applies light such as infrared radiation to the target body.

The depth sensor 620 includes a light-receiving section that receives reflected light from the body. The depth sensor 620 extracts reflected light from the body irradiated by the light-emitting section 610 by calculating the difference between the quantity of light received when the light-emitting section 610 emits light and the quantity of light received when the light-emitting section 610 does not emit light. Specifically, the depth sensor 620 outputs a reflected light image (i.e., input image) obtained by extracting reflected light from the body irradiated by the light-emitting section 610 to the storage section 660 every predetermined unit time (e.g., 1/60th of a second). The distance (depth value) between the input section 60 and the body can be acquired from the reflected light image in pixel units.

Figure 19A:
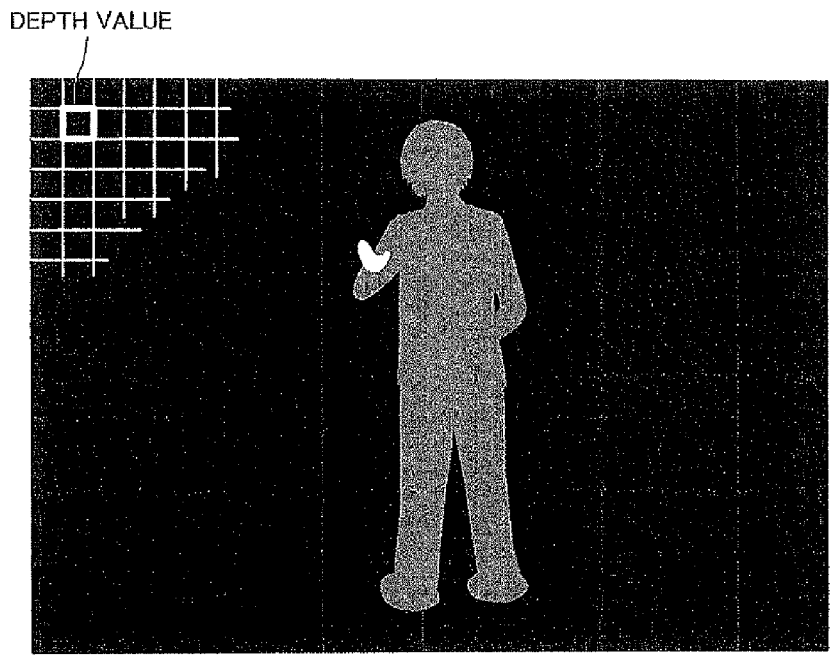
FIGS. 19A and 19B are diagrams illustrating an image input to an input section according to one embodiment of the invention.
Figure 19B:
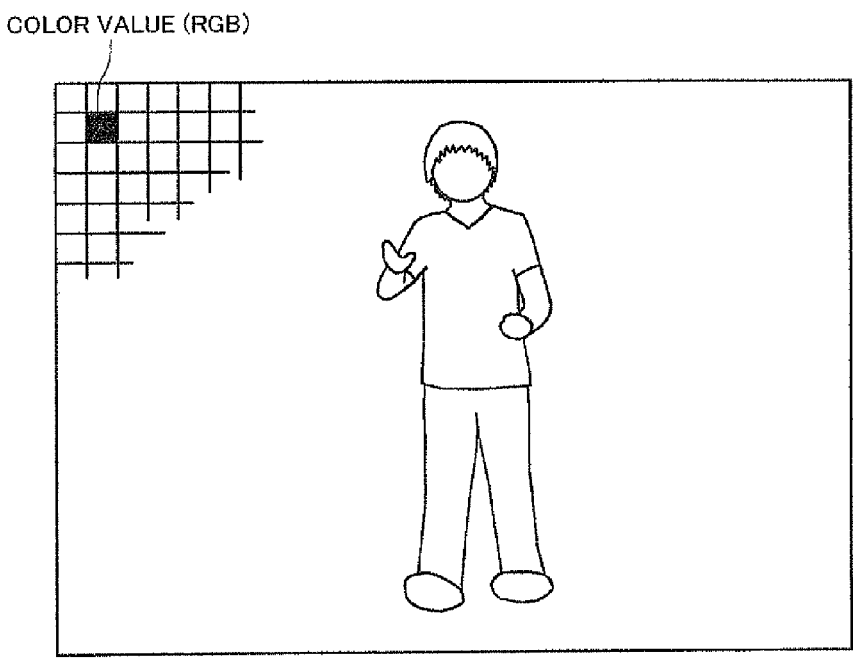

The RGB camera 630 focuses light emitted from the body (player P) on a light-receiving plane of an imaging element using an optical system (e.g., lens), photoelectrically converts the light and shade of the image into the quantity of electric charge, and sequentially reads and converts the electric charge into an electrical signal. The RGB camera 630 then outputs an ROB (color) image (i.e., input image) to the storage section 660. For example, the ROB camera 630 generates an RGB image illustrated in FIG. 19B. The RGB camera 630 outputs the RGB image to the storage section 660 every predetermined unit time (e.g., 1/60th of a second).

The depth sensor 620 and the RGB camera 630 may receive light from a common light-receiving section. In this case, two light-receiving sections may be provided. The light-receiving section for the depth sensor 620 may differ from the light-receiving section for the RGB camera 630.

The sound input section 640 performs a voice recognition process, and may be a multiarray microphone, for example.

The processing section 650 instructs the light emission timing of the light-emitting section 610, and transmits the reflected light image output from the depth sensor 620 and the RGB image acquired by the RGB camera 630 to the game machine 50.

The storage section 660 sequentially stores the reflected light image output from the depth sensor 620 and the RGB image output from the RGB camera 630.

The game machine 50 according to this embodiment is described below. The game machine 50 according to this embodiment includes a storage section 570, a processing section 500, an information storage medium 580, and a communication section 596.

The defined input information stored in a determination information storage section 573 of the second game system includes a moving vector (motion vector) defined in advance that is used to determine the moving vector (motion vector) of a feature point of the input image (reflected light image and RGB image) during the determination period.

The processing section 500 performs various processes according to this embodiment based on data read from a program stored in the information storage medium 580. Specifically, the information storage medium 580 stores a program that causes a computer to function as each section according to this embodiment (i.e., a program that causes a computer to perform the process of each section).

The communication section 596 can communicate with another game machine through a network (Internet). The function of the communication section 596 may be implemented by hardware such as a processor, a communication ASIC, or a network interface card, a program, or the like.

A program that causes a computer to function as each section according to this embodiment may be distributed to the information storage medium 580 (or the storage section 570) from a storage section or an information storage medium included in a server through a network. Use of the information storage medium included in the server is also included within the scope of the invention.

The processing section 500 (processor) performs a game process, an image generation process, and a sound control process based on the information received from the input section 60, a program loaded into the storage section 570 from the information storage medium 580, and the like.

The processing section 500 of the second game system functions as an acquisition section 510, a disposition section 511, a movement/motion processing section 512, an object control section 513, a determination section 514, an image generation section 520, and a sound control section 530.

The acquisition section 510 according to the second embodiment acquires input image information (e.g., reflected light image and RGB image) from the input section 60.

The disposition section 511 determines the position of the object in the virtual space based on the positional relationship between the body and the input section 60, the positional relationship being determined based on the input image (at least one of the reflected light image and the RGB image).

A movement processing section of the movement/motion processing section 512 may control the moving speed of the object based on the distance between the input section 60 and the body, the distance being determined based on the input image.

The object control section 513 controls the size of the object in the virtual space based on the distance between the input section 60 and the body, the distance being determined based on the input image. For example, the object control section 513 reduces the scaling factor of the object as the distance between the input section 60 and the object decreases, and increases the scaling factor of the object as the distance between the input section 60 and the object increases.

The object control section 513 may control the degree by which the scaling factor of the object is changed with the lapse of time based on the distance between the input section 60 and the body, the distance being determined based on the input image.

The determination section 514 includes a timing determination section 514A and an input information determination section 514B. The timing determination section 514A determines whether or not the moving vector that indicates the moving amount and the moving direction of a feature point (given area) specified based on the input image coincides with the moving vector corresponding to the start timing of the determination period (reference determination period or auxiliary determination period A) defined in advance.

The input information determination section 514B determines whether or not the moving vector (moving vector group) that has been acquired during the determination period and indicates the moving amount and the moving direction of a feature point (given area) specified based on the input image coincides with the moving vector (defined moving vector group) corresponding to the determination period (reference determination period or auxiliary determination period A) defined in advance.

The timing determination section 514A and the input determination section 514B may adjust the difficulty level based on the distance between the input section 60 and the body, the distance being determined based on the input image, and perform the determination process.

A virtual camera control section 515 controls the position of the virtual camera in the virtual three-dimensional space. The virtual camera control section 515 may control the position of the virtual camera based on the distance between the input section 60 and the body, the distance being determined based on the input image (reflected light image). The virtual camera control section 515 may control the angle of view of the virtual camera based on the distance between the input section 60 and the object specified based on the input image (reflected light image). The virtual camera control section 515 may control the view direction (line-of-sight direction) of the virtual camera based on the positional relationship between the body and the input section 60, the positional relationship being determined based on the reflected light image.

2-3. Input Section

The input section 60 of the second game system includes the depth sensor 620 and the RGB camera 630, and receives input by image processing the body (e.g., the player or the hand of the player) without the need of an input device (e.g., controller). This makes it possible to perform various novel game processes. The depth sensor 620 and the RGB camera 630 of the input section 60 are described below.

2-3-1. Depth Sensor

Figure 20:
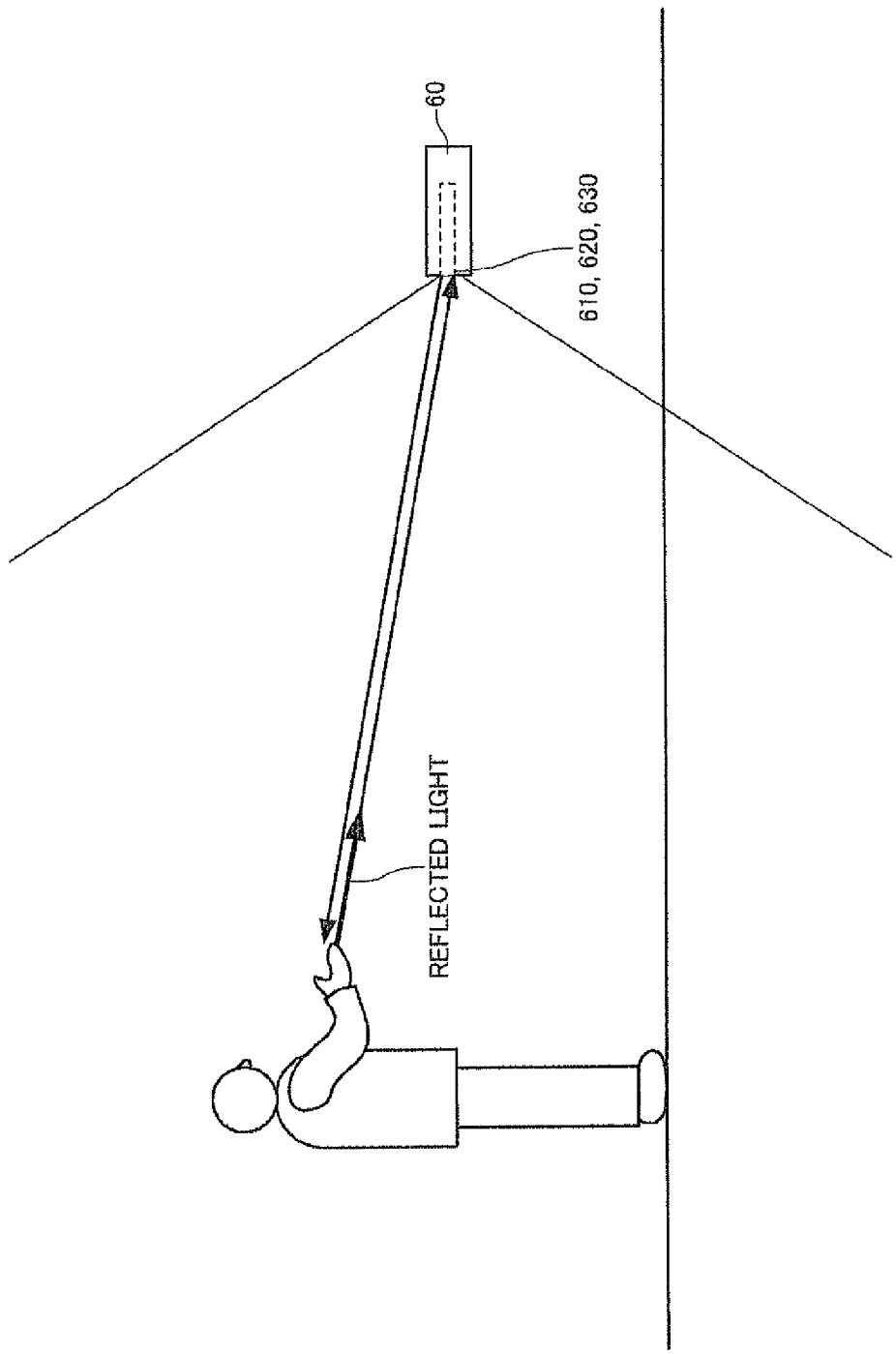
FIG. 20 is a diagram illustrating a depth sensor according to one embodiment of the invention.

The depth sensor 620 according to this embodiment is described below with reference to FIG. 20. As illustrated in FIG. 20, the light-emitting section 610 included in the input section 60 emits light that temporally changes in intensity based on a timing signal. The light emitted from the light-emitting section 610 is applied to the player P (body) positioned in front of the light source.

The depth sensor 620 receives reflected light of the light emitted from the light-emitting section 610. The depth sensor 620 generates a reflected light image obtained by extracting the spatial intensity distribution of reflected light. For example, the depth sensor 620 extracts reflected light from the body irradiated by the light-emitting section 610 to obtain a reflected light image by calculating the difference between the quantity of light received when the light-emitting section 610 emits light and the quantity of light received when the light-emitting section 610 does not emit light. The value of each pixel of the reflected light image corresponds to the distance (depth value) between a position GP of the input section 60 (depth sensor 620) and the body. The position GP of the input section 60 is synonymous with the position of the depth sensor 620 and the light-receiving position of the depth sensor 60.

In the example illustrated in FIG. 20, since the hand of the player P is positioned closest to the position GP of the input section 60, a reflected light image in which an area that indicates the hand of the player P (see FIG. 19A) is an area (high-luminance area) with the maximum quantity of received light.

In this embodiment, a pixel having a luminance (quantity of received light or pixel value) equal to or larger than a predetermined value is extracted from the reflected light image as a pixel close to the position GP of the input section 60. For example, when the grayscale of the reflected light image is 256, a pixel having a value equal to or larger than a predetermined value (e.g., 200) is extracted as the high-luminance area.

Figure 21:
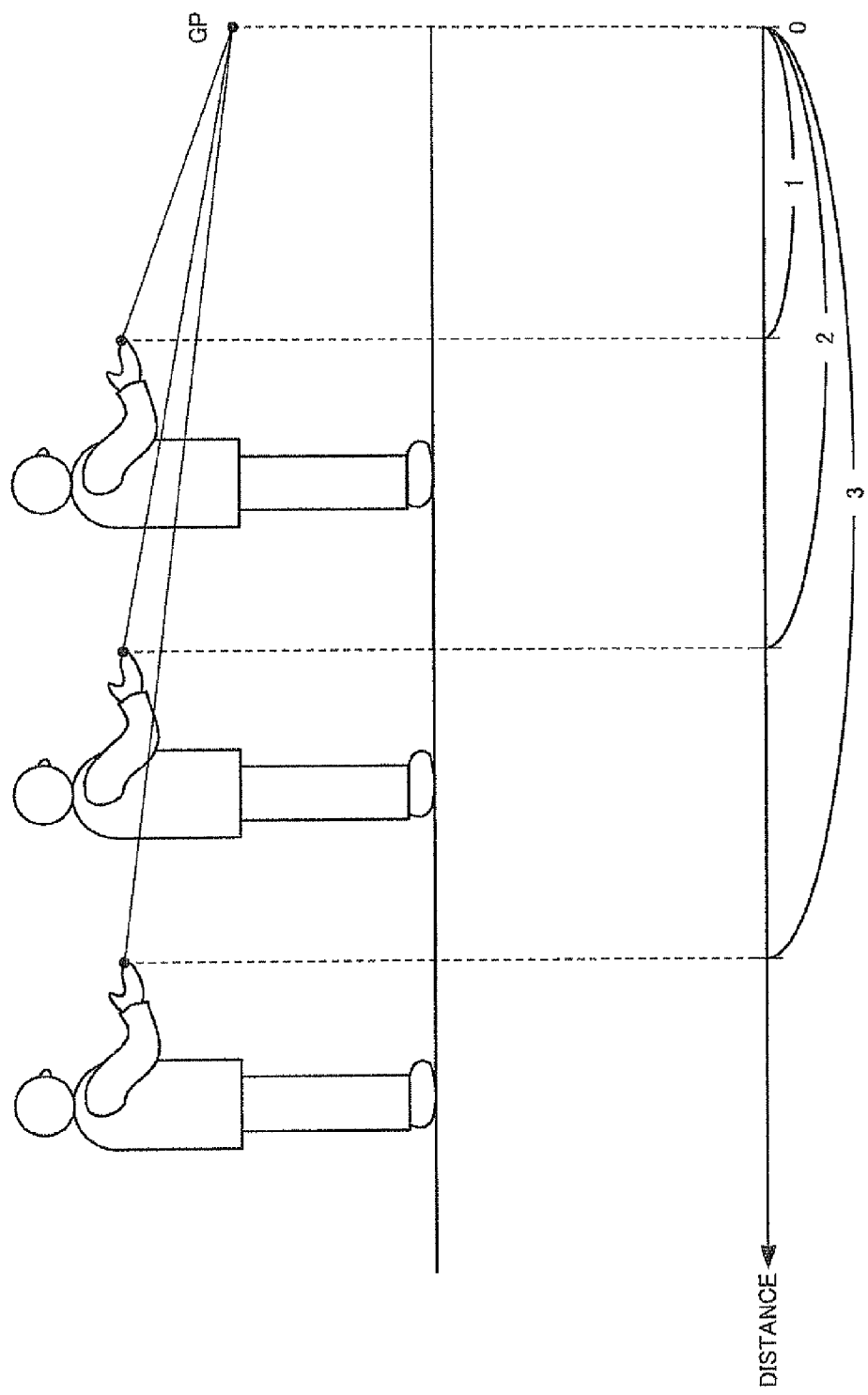
FIG. 21 is a diagram illustrating a depth sensor according to one embodiment of the invention.

The reflected light image obtained by the depth sensor is correlated with the distance (depth value) between the position GP of the input section 60 and the body. As illustrated in FIG. 21, when the player P is positioned at a distance of 1 m from the position GP of the input section 60, the area of the hand in the reflected light image has high luminance (i.e., the quantity of received light is large) as compared with the case where the player P is positioned at a distance of 2 m from the position GP of the input section 60. When the player P is positioned at a distance of 2 m from the position GP of the input section 60, the area of the hand in the reflected light image has a high luminance (i.e., the quantity of received light is large) as compared with the case where the player P is positioned at a distance of 3 m from the position GP of the input section 60.

In this embodiment, the position of the player P in the real space is calculated based on the luminance of the pixel extracted from the reflected light image as the high-luminance area by utilizing the above principle. For example, a pixel of the reflected light image having the highest luminance value is used as a feature point, and the distance between the position GP and the player P is calculated based on the luminance of the feature point. Note that the feature point may be the center pixel of the area of the hand determined based on a shape pattern provided in advance, the moving vector, or the like. When the reflected light image includes a large high-luminance area, it may be determined that the body is positioned near the input section as compared with the case where the high-luminance area is small, for example.

In this embodiment, the position of the body in the real space with respect to the input section 60 may be determined based on the reflected light image. For example, when the feature point is positioned at the center of the reflected light image, it may be determined that the body is positioned along the light-emitting direction of the light source of the input section 60. When the feature point is positioned in the upper area of the reflected light image, it may be determined that the body is positioned higher than the input section 60. When the feature point is positioned in the lower area of the reflected light image, it may be determined that the body is positioned lower than the input section 60. When the feature point is positioned in the left area of the reflected light image, it may be determined that the body is positioned on the right side with respect to the input section 60 (when viewed from the input section (light source)). When the feature point is positioned in the right area of the reflected light image, it may be determined that the body is positioned on the left side with respect to the input section 60 (when viewed from the input section (light source)). In this embodiment, the positional relationship between the body and the input section 60 can thus be determined based on the reflected light image.

In this embodiment, the moving direction of the body in the real space may be determined based on the reflected light image. For example, when the feature point is positioned at the center of the reflected light image, and the luminance of the feature point increases, it may be determined that the body moves in the direction of the light source of the input section 60. When the feature point moves from the upper area to the lower area of the reflected light image, it may be determined that the body moves downward relative to the input section 60. When the feature point moves from the left area to the right area of the reflected light image, it may be determined that the body moves leftward relative to the input section 60. Specifically, the moving direction of the body relative to the input section 60 may be determined based on the reflected light image.

Note that the reflected light from the body decreases to a large extent as the distance between the body and the position GP of the input section 60 increases. For example, the quantity of received light per pixel of the reflected light image decreases in inverse proportion to the second power of the distance between the body and the position GP of the input section 60. Therefore, when the player P is positioned at a distance of about 20 m from the input section 60, the quantity of received light from the player P decreases to a large extent so that a high-luminance area that specifies the player P cannot be extracted. In this case, it may be determined that there is no input. When a high-luminance area cannot be extracted, alarm sound may be output from the speaker.

2-3-2. RGB Camera

In this embodiment, an RGB image is acquired by the RGB camera (imaging section) 630 as the input information. Since the RGB image corresponds to the reflected light image, the extraction accuracy of the moving vector (motion vector) of the body and the shape area can be improved.

In this embodiment, a digitized RGB image is acquired from the ROB camera based on the drawing frame rate (e.g., 60 frames per second (fps)), for example. The moving vector (motion vector) that indicates the moving amount and the moving direction of the feature point between two images that form a video image captured by the RGB camera 630 is calculated. The feature point of the image refers to one or more pixels that can be determined by corner detection or edge extraction. The moving vector is a vector that indicates the moving direction and the moving amount of the feature point (may be an area including the feature point) in the current image (i.e., optical flow). The optical flow may be determined by a gradient method or a block matching method, for example. In this embodiment, the contour of the player P and the contour of the hand of the player P are detected from the captured image by edge extraction, and the moving vector of the pixel of the detected contour is calculated, for example.

In this embodiment, it is determined that the player P has performed an input operation when the moving amount of the feature point is equal to or larger than a predetermined moving amount. The moving vector of the feature point is matched with the defined moving vector provided in advance to extract the area of the hand of the player P. In this embodiment, the body may be extracted based on the RGB color value of each pixel of the RGB image acquired by the RGB camera 630.

According to this embodiment, the distance (depth value) between the input section 60 and the body can be determined by the depth sensor 620, and the position coordinates (X, Y) and the moving vector of the feature point (high-luminance area) in a two-dimensional plane (reflected light image or RGB image) can be extracted. Therefore, the position Q of the object in the real space based on the input section 60 can be determined based on the distance (Z) between the input section 60 and the body, and the position coordinates (X,Y) in the reflected light image and the RGB image.

2-4. Object Control

In this embodiment, a display image displayed on the display section is generated based on the input image (reflected light image or RGB image) obtained by the input section 60. The details thereof are described below.

2-4-1. Object Size Control Method

In this embodiment, the size of the object disposed in the virtual space is controlled based on the distance L between the position GP of the input section 60 and the body calculated based on the reflected light image.

Figure 22:
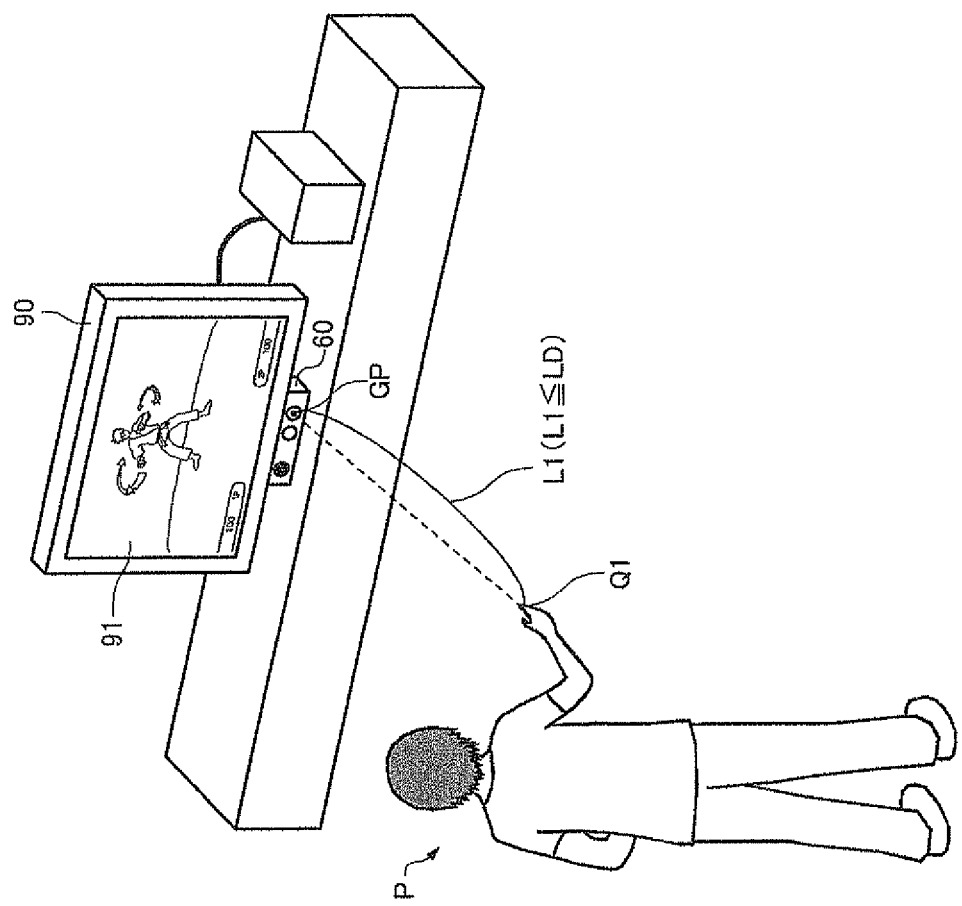
FIG. 22 is a diagram illustrating the positional relationship between the position of a body and an input section in the real space according to one embodiment of the invention.
Figure 23A:
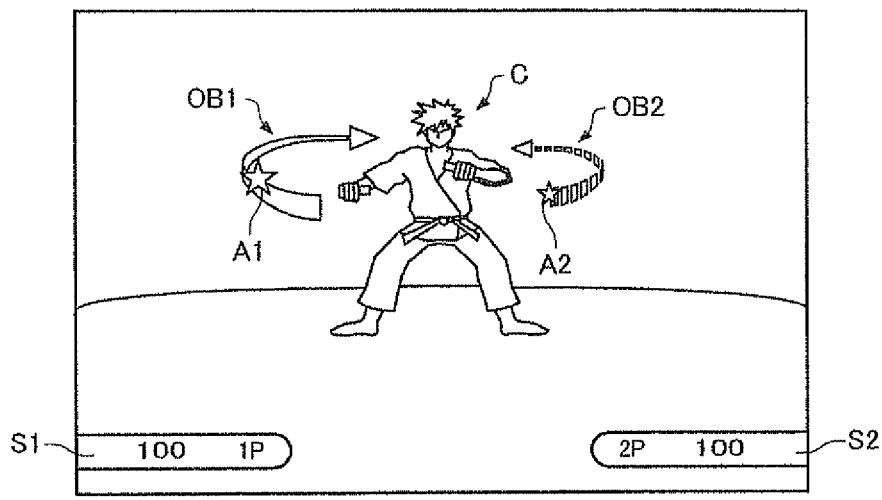
FIGS. 23A and 23B are diagrams illustrating an example of a game screen.

As illustrated in FIG. 22, when the distance between the position GP of the input section 60 and the body is L1 that is equal to or shorter than a predetermined distance LD (L1≤LD), the objects such as the instruction object OB1, the moving timing mark A1, the advance instruction object OB2, the moving timing mark A2, and the character C are scaled up/down at a predetermined scaling factor (e.g., 1), and an image is generated. For example, a display image illustrated in FIG. 23A is displayed.

Figure 23B:
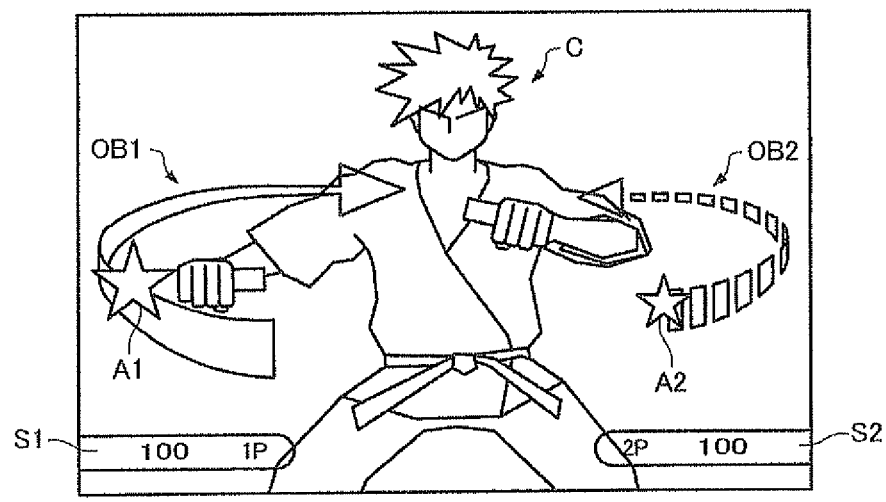
Figure 24:
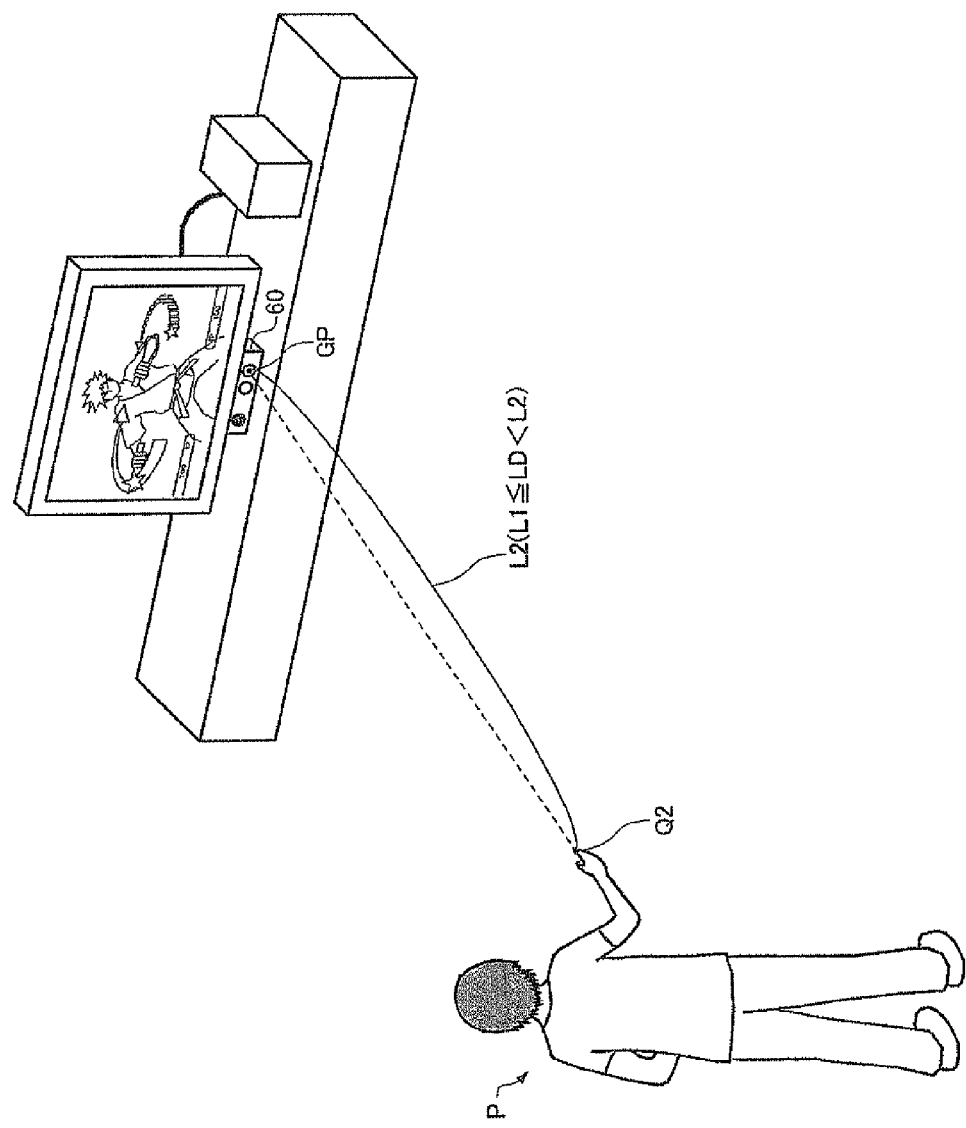
FIG. 24 is a diagram illustrating the positional relationship between the position of a body and an input section in the real space according to one embodiment of the invention.

As illustrated in FIG. 24, when the distance between the position GP of the input section 60 and the body is L2 that is longer than the predetermined distance LD (L1≤LD<L2), the scaling factor of the object is increased as compared with the case where the distance between the position GP of the input section 60 and the object is L1. For example, the object is scaled up at a scaling factor of 2 (see FIG. 23B), and an image is generated.

Specifically, the scaling factor of the object is controlled based on a change in the distance L between the position GP of the input section 60 and the body. For example, the scaling factor of the object is reduced as the distance L decreases, and the scaling factor of the character C is increased as the distance L increases.

In this embodiment, since the reflected light image is acquired at predetermined intervals (e.g., the drawing frame rate (60 fps)), the distance L between the position GP of the input section 60 and the body can be calculated in real time. Therefore, the scaling factor of the object may be controlled in real time based on a change in the distance L.

In this embodiment, the object modeled in advance at a scaling factor of 1 is stored in the storage section 570. A control target (scaling target) object and a non-control target (non-scaling target) object are distinguishably stored in the storage section 570.

Specifically, a control flag "1" is stored corresponding to the ID of each control target object (i.e., character C, instruction object OB1, advance instruction object OB2, and moving timing marks A1 and A2), and a control flag "0" is stored corresponding to the ID of each non-control target object (e.g., scores S1 and S2).

The scaling factor of the object for which the control flag "1" is set is calculated based on the distance L, and the object is scaled up/down based on the calculated scaling factor. This makes it possible to scale up/down the object that provides information necessary for the player. In this embodiment, the instruction object for input evaluation is set to the control target object.

According to this embodiment, since the size of the object is controlled based on the distance L between the position GP of the input section 60 and the body, it is possible to generate a display image including an object having an appropriate size for the player P. For example, since the object and the character are scaled up when the player P has moved away from the input section 60, the player P can easily determine the instructions required for input determination. Since the instruction object OB1 and the character C are scaled down when the player P has approached the input section 60, the player P can easily determine the instructions by observing the object having an appropriate size.

In this embodiment, the size of the object may be controlled based on the input determination results (timing determination results or input information determination results). Specifically, the size of the object may be controlled based on the distance L between the position GP of the input section 60 and the body, and the input determination results.

For example, the scaling factor of the object may be controlled (e.g., 2) based on the distance L when the input start timing coincides with the start timing (reference start timing or auxiliary start timing) of the determination period, and the scaling factor of the object calculated based on the distance L is increased (e.g., 3) when the input start timing does not coincide with the start timing of the determination period. This allows an inexperienced player to easily observe the object.

The scaling factor of the object may be controlled (e.g., 2) based on the distance L when the input information that has been input during the determination period (reference determination period or auxiliary determination period) coincides with the defined input information, and the scaling factor of the object calculated based on the distance L is increased (e.g., 3) when the input information does not coincide with the defined input information. This allows the player to easily observe the object, so that the possibility that the input information is determined to coincide with the defined input information during the determination period can be increased.

The scaling factor of the object may be controlled based on the distance L when the score S1 of the player is equal to or higher than a predetermined score value, the scaling factor of the object calculated based on the distance L is increased when the score S1 of the player is lower than a predetermined score value. This allows the player to easily obtain a high score (i.e., the object can be controlled with a size appropriate for the level of the player).

2-4-2. Change in Scaling Factor

In this embodiment, the instruction object OB1 is scaled up with the lapse of time during the advance period or the reference determination period, as illustrated in FIGS. 13 and 14. For example, when the scaling factor of the previously modeled instruction object OB1 is 1, the scaling factor is changed with the lapse of time so that the size of the instruction object OB1 is equal to that of the previously modeled instruction object OB1 at the reference start timing BS, and becomes larger than that of the previously modeled instruction object OB1 by a factor of 1.5 at the reference end timing BE. The instruction object OB1 is scaled up based on the scaling factor that changes with the lapse of time.

In this embodiment, the degree by which the scaling factor of the instruction object is changed with the lapse of time during the advance period or the reference determination period is controlled based on the distance between the body and the input section 60, the distance being determined based on the reflected light image.

As illustrated in FIG. 22, when the distance between the position GP of the input section 60 and the body is L1 that is equal to or shorter than the predetermined distance LD (L1≤LD), the scaling factor of the instruction object OB1 is changed with the lapse of time by a degree of 1 to 2 (range from 1 to 2), for example.

As illustrated in FIG. 24, when the distance between the position GP of the input section 60 and the body is L2 that is longer than the predetermined distance LD (L1≤LD<L2), the degree by which the scaling factor of the instruction object OB1 is changed is increased as compared with the case where the distance between the position GP of the input section 60 and the object is L1. For example, the scaling factor of the instruction object OB1 is changed with the lapse of time by a degree of 1 to 3 (range from 1 to 3). This makes it possible for the player to easily determine the advance period or the determination period even if the player is positioned away from the input section 60.

2-5. Virtual Camera Control

In this embodiment, the position and the angle of view of the virtual camera may be controlled based on the distance L between the position GP of the input section 60 and the body and the position Q of the body calculated based on the reflected light image.

According to this embodiment, the distance L can be calculated in real time at predetermined intervals. Therefore, the position and the angle of view of the virtual camera may be controlled in real time based on the distance L.

2-5-1. Viewpoint Position Control

Figure 25A:
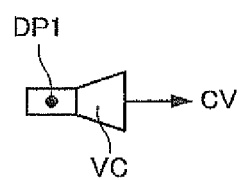
FIGS. 25A and 25B are diagrams illustrating virtual camera control.
Figure 25A:
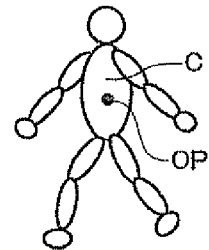
Figure 25A:
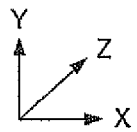

In this embodiment, the viewpoint position of the virtual camera VC is controlled as described below. For example, when the distance between the position GP of the input section 60 and the body (player P) is L1 (L1≤LD) (see FIG. 22), the virtual camera VC is disposed at a position DP1 in the virtual three-dimensional space (see FIG. 25A).

Figure 25B:
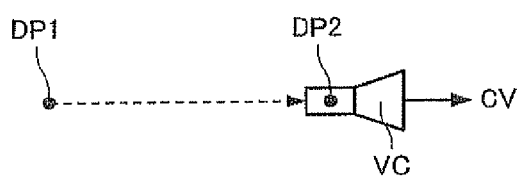
Figure 25B:
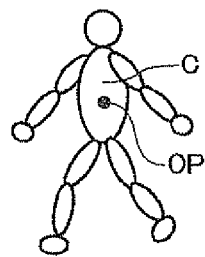
Figure 25B:
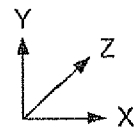

When the distance between the position GP of the input section 60 and the body is L2 (L1≤LD<L2) (see FIG. 24), the virtual camera VC is moved in a view direction CV as compared with the case where the distance L is L1, and disposed at a position DP2 (see FIG. 25B).

For example, when the character C is disposed at a constant position within the field-of-view range of the virtual camera VC disposed at the position DP1, the character C is scaled up in the generated display image by moving the virtual camera VC from the position DP1 to the position DP2. Specifically, the character C is scaled up by a perspective projection transformation process, so that a display image including an object having an appropriate size for the player P can be generated.

2-5-2. Angle of View Control

Figure 26A:
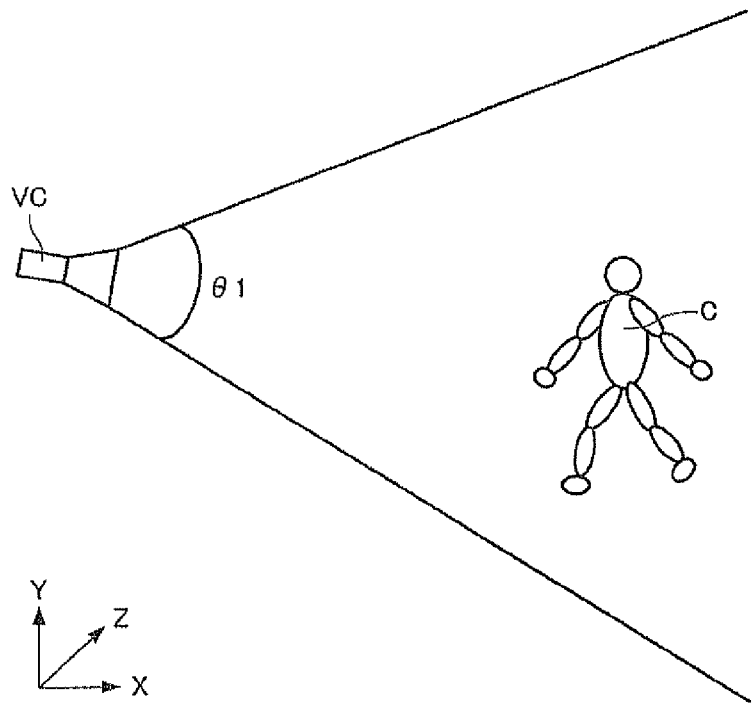
FIGS. 26A and 26B are diagrams illustrating virtual camera control.

In this embodiment, the angle of view of the virtual camera VC is controlled as described below. For example, when the distance between the position GP of the input section 60 and the body (player P) is L1 (L1≤LD) (see FIG. 22), the angle of view of the virtual camera is set to theta1 (see FIG. 26A).

Figure 26B:
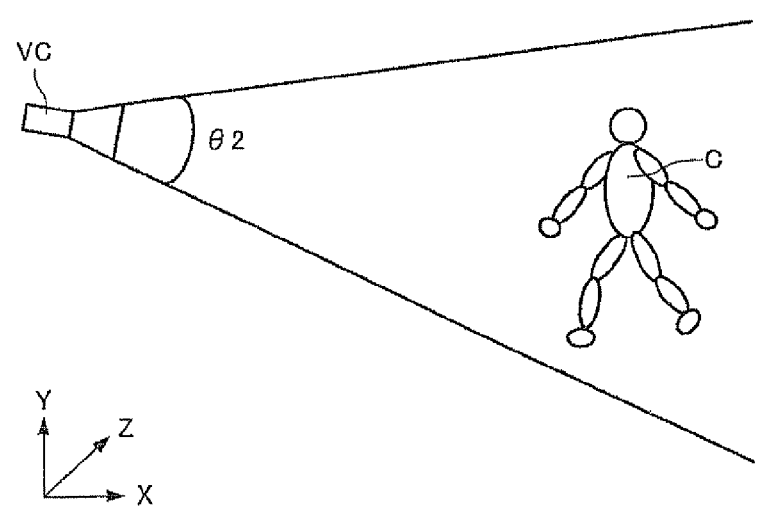

When the distance between the position GP of the input section 60 and the body is L2 (L1≤LD<L2), the angle of view of the virtual camera VC is reduced to theta2 as compared with the case where the distance L is L1 (see FIG. 26B). Specifically, the field of view is reduced (zoom in). Therefore, since the character C is scaled up, an image that can be easily observed by the player can be provided. When the distance L has changed from L2 to L1, the field of view is increased by increasing the angle of view (zoom out). Therefore, since the character C is scaled down, an image that can be easily observed by the player can be provided.

2-6. Input Determination Process

In the second embodiment, the input determination process is performed by determining the input timing and the input information (moving vector (motion vector) and moving path) based on the reflected light image and the RGB image.

For example, it is determined that the player has performed an input operation when the moving amount of the moving vector between images of a video image (reflected light image and RGB image) is equal to or larger than a predetermined amount, and the moving direction coincides with the defined moving vector.

Whether or not the input start timing IS coincides with the start timing (e.g., reference start timing BS) of the determination period is determined by detennining whether or not the moving vector that indicates the moving amount and the moving direction of the feature point (given area) specified based on the reflected light image and the RGB image coincides with the moving vector corresponding to the start timing of the determination period (reference determination period or auxiliary determination period A) defined in advance.

Whether or not the input information that has been input during the determination period coincides with the defined input information MD is determined by determining whether or not the moving vector (moving vector group when extracting the feature point (given area) between three or more input images) that has been acquired during the determination period (reference determination period or auxiliary determination period) and indicates the moving amount and the moving direction of the feature point (given area) specified based on the input image (reflected light image and RGB image) coincides with the defined moving vector (defined moving vector group when defining the movement of the feature point between three or more images) of the feature point between images during the determination period (reference determination period or auxiliary determination period) defined in advance.

In the second embodiment, a plurality of auxiliary start timings PS1, PS2, and PS3 corresponding to the reference start timing BS are also defined, as illustrated in FIG. 8, and whether or not the input start timing IS coincides with the auxiliary start timing PS1, PS2, or PS3 is determined. For example, whether or not the input start timing IS coincides with the auxiliary start timing PS1, PS2, or PS3 is determined by determining whether or not the input start timing coincides with the auxiliary start timing at each of the plurality of auxiliary start timings.

In the second embodiment, the difficulty level of the input timing determination process may be adjusted based on the distance L between the position GP of the input section 60 and the body. For example, when the distance between the position GP of the input section 60 and the body is L1 (L1≤LD) (see FIG. 22), only the auxiliary start timing PS1 is set corresponding to the reference start timing BS. When the distance between the position GP of the input section 60 and the object is L2 (L1≤LD<L2) (see FIG. 24), the auxiliary start timings PS1, PS2, and PS3 are set corresponding to the reference start timing BS. Specifically, the difficulty level of the input timing determination process is reduced by increasing the number of auxiliary start timings as the distance between the body and the position GP of the input section 60 increases, and is increased as the object approaches the input section 60.

In the second embodiment, the difficulty level of the input information determination process may be adjusted based on the distance between the position GP of the input section 60 and the body. For example, when the distance between the position GP of the input section 60 and the body is L1 (L1≤LD) (see FIG. 22), whether or not the input information that has been input during the reference determination period or the auxiliary determination period coincides with the defined input information MD1 is determined. When the distance between the position GP of the input section 60 and the object is L2 (L1≤LD<L2) (see FIG. 24), whether or not the input information that has been input during the reference determination period or the auxiliary determination period coincides with the defined input information MD1, MD2, or MD3 is determined. Specifically, the difficulty level of the input information determination process is reduced by increasing the number of pieces of defined input information as the distance between the body and the position GP of the input section 60 increases, and is increased as the body approaches the input section 60.

Specifically, it becomes difficult for the player P to observe the instruction object as the player P moves away from the input section 60, and the accuracy of the feature point extracted based on the reflected light image and the RGB image deteriorates. In the second embodiment, since it is disadvantageous for the player to move away from the input section 60, the difficulty level of the input determination process may be adjusted.

According to this embodiment, the distance L can be acquired in real time at predetermined intervals (e.g., drawing frame rate (60 fps)). Therefore, the difficulty level of the input information determination process may be adjusted in real time based on the distance L.

2-7. Flow of Process According to Second Embodiment

Figure 27:
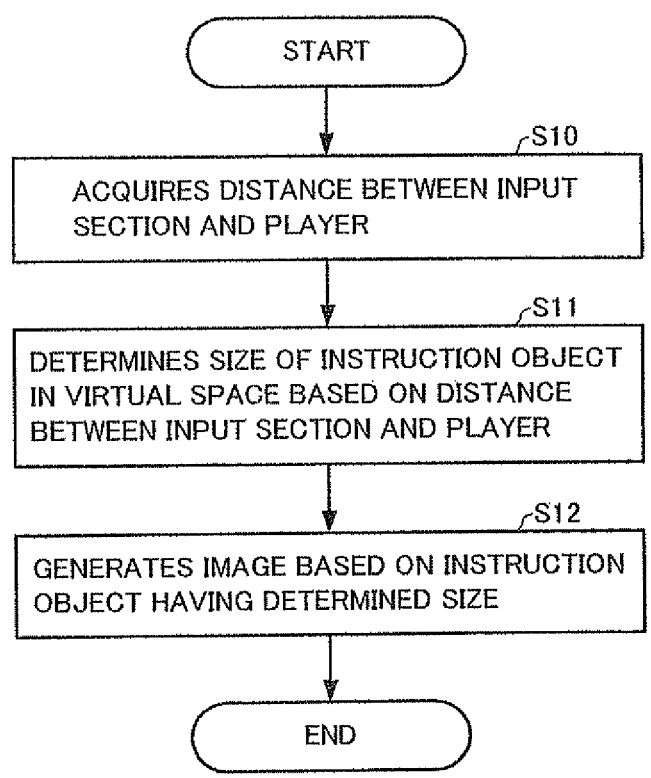
FIG. 27 is a flowchart according to one embodiment of the invention.

The flow of the process according to the second embodiment is described below with reference to FIG. 27. The distance between the input section 60 and the player is acquired (step S10). The size of the instruction object in the virtual space is determined based on the distance between the input section 60 and the player (step S11). An image is generated based on the instruction object having the determined size (step S12).

2-8. Application Example 2-8-1. First Application Example

In this embodiment, the positional relationship between the body and the input section 60 can be determined based on the reflected light image. A first application example illustrates an example of a process based on the positional relationship between the body and the input section.

(1) Position of Object

Figure 28:
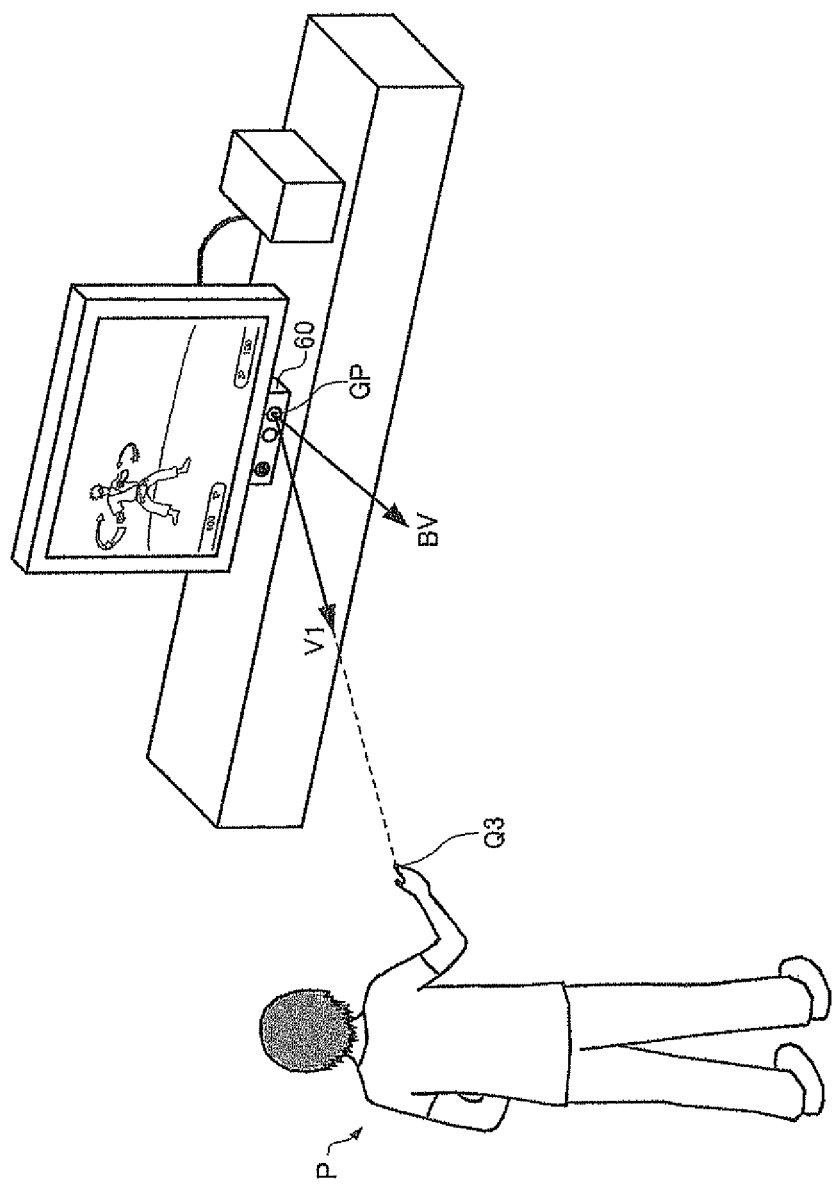
FIG. 28 is a diagram illustrating the positional relationship between the position of a body and an input section in the real space according to one embodiment of the invention.
Figure 29A:
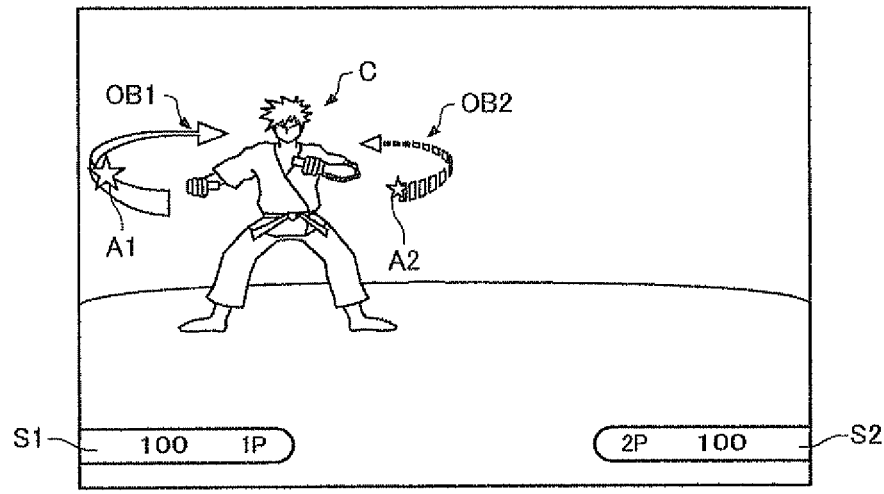
FIGS. 29A and 29B are diagrams illustrating an example of a game screen.

In this embodiment, the position of the object disposed in the virtual space may be determined based on the positional relationship between the body and the input section 60, the positional relationship being determined based on the reflected light image. As illustrated in FIG. 28, when the player P is positioned on the left side of the position GP of the input section 60, a high-luminance area is extracted from the right area of the reflected light image, for example. Therefore, it is determined that the player P is positioned on the left side of the input section 60. In this case, the object is moved to the left area of the screen, as illustrated in FIG. 29A.

Figure 29B:
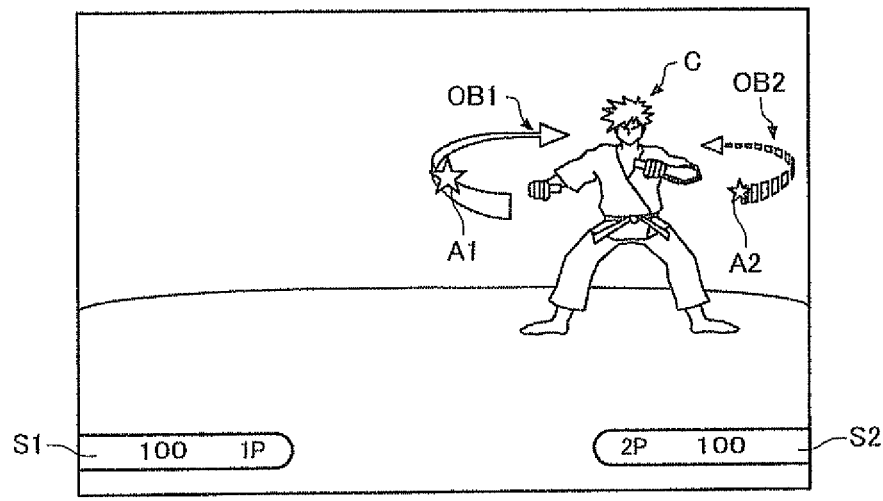
Figure 30:
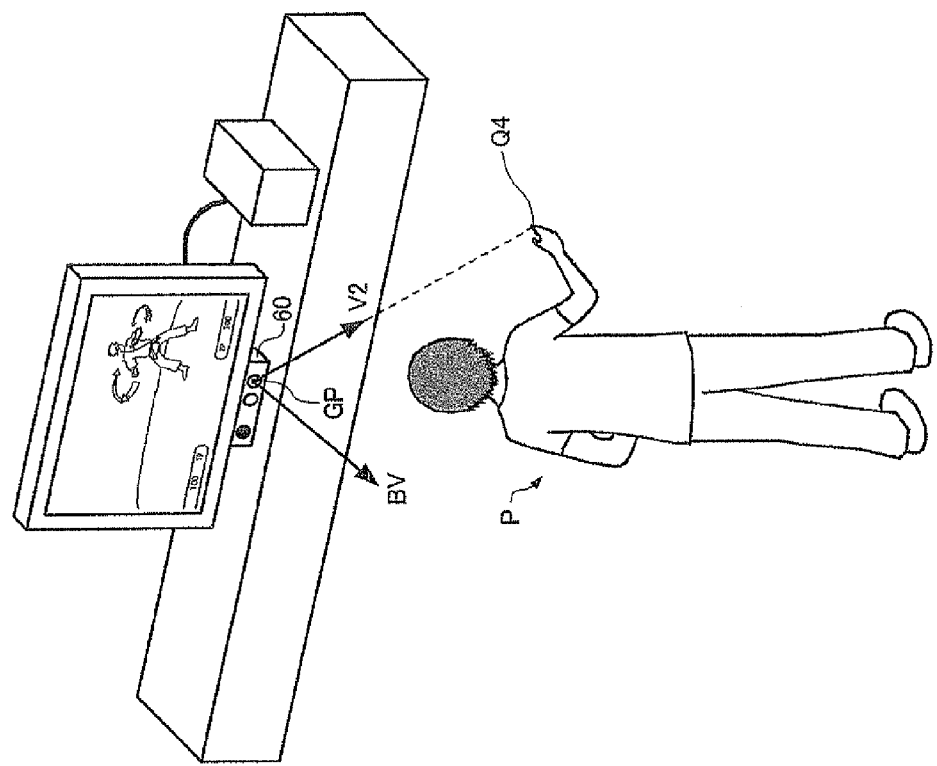
FIG. 30 is a diagram illustrating the positional relationship between the position of a body and an input section in the real space according to one embodiment of the invention.

As illustrated in FIG. 30, when the player P is positioned on the right side of the position GP of the input section 60, a high-luminance area is extracted from the left area of the reflected light image. Therefore, it is determined that the player P is positioned on the right side of the input section 60. In this case, the object is moved to the right area of the screen, as illustrated in FIG. 29B.

Specifically, since the position of the object disposed in the virtual space can be determined based on the positional relationship between the body and the input section 60, the positional relationship being determined based on the input image, it is possible to provide a display image in which the object is disposed at a position at which the object can be easily observed by the player. Note that the position of the object may be determined in real time.

(2) Moving Direction

In this embodiment, the moving direction of the object in the virtual space may be controlled based on the positional relationship between the body and the input section 60, the positional relationship being determined based on the reflected light image. In the example illustrated in FIG. 28, it is determined that the player P is positioned on the left side of the input section 60 based on the reflected light image. In this case, the object may be moved to the left area of the screen.

In the example illustrated in FIG. 30, it is determined that the player P is positioned on the right side of the input section 60 based on the reflected light image. In this case, the object may be moved to the right area of the screen.

Specifically, since the moving direction of the object in the virtual space can be determined based on the positional relationship between the body and the input section 60, the positional relationship being determined based on the input image, it is possible to provide a display image in which the object is disposed at a position at which the object can be easily observed by the player. Note that the position of the object may be determined in real time.

(3) View Direction

In this embodiment, the view direction of the virtual camera in the virtual space may be controlled based on the positional relationship between the body and the input section 60, the positional relationship being determined based on the reflected light image.

Figure 31A:
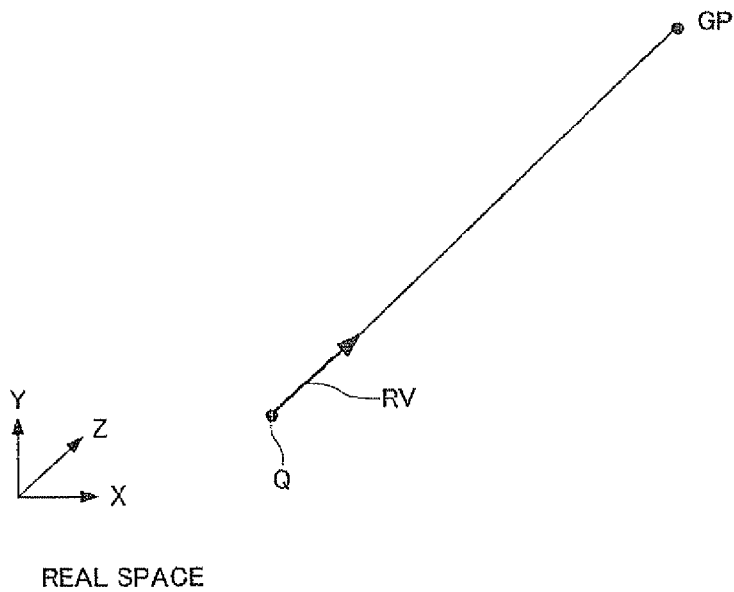
FIGS. 31A and 31B are diagrams illustrating virtual camera control.
Figure 31B:
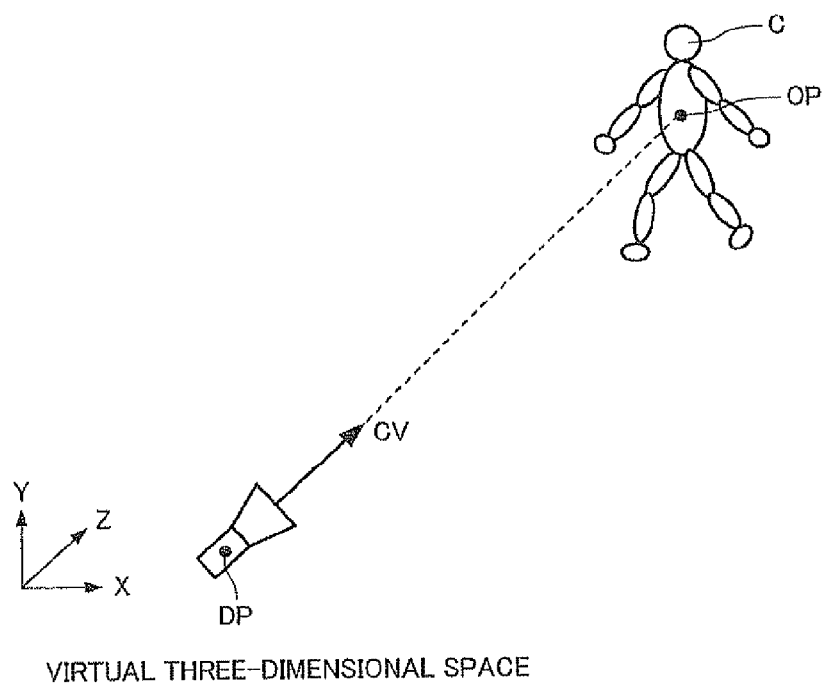

As illustrated in FIGS. 31A and 31B, a vector RV that starts from the position Q of the player P determined based on the reflected light image and the RGB image and reaches the position GP of the input section 60 may be calculated, and the view direction CV of the virtual camera may be controlled based on the vector RV. Specifically, the view direction CV of the virtual camera is made to follow the direction of the vector RV. According to this configuration, since the view direction CV of the virtual camera in the virtual three-dimensional space can be controlled in the direction that connects the player and the input section 60, a realistic display image can be provided.

2-8-2. Second Application Example

This embodiment may be applied to a music game that determines the input timing in synchronization with reproduction of music data. For example, this embodiment may be applied to a game system that allows the player to give a performance to the rhythm indicated by the music data by virtually striking a percussion instrument (e.g., drum) at the reference timing indicated by the music data.

Figure 32:
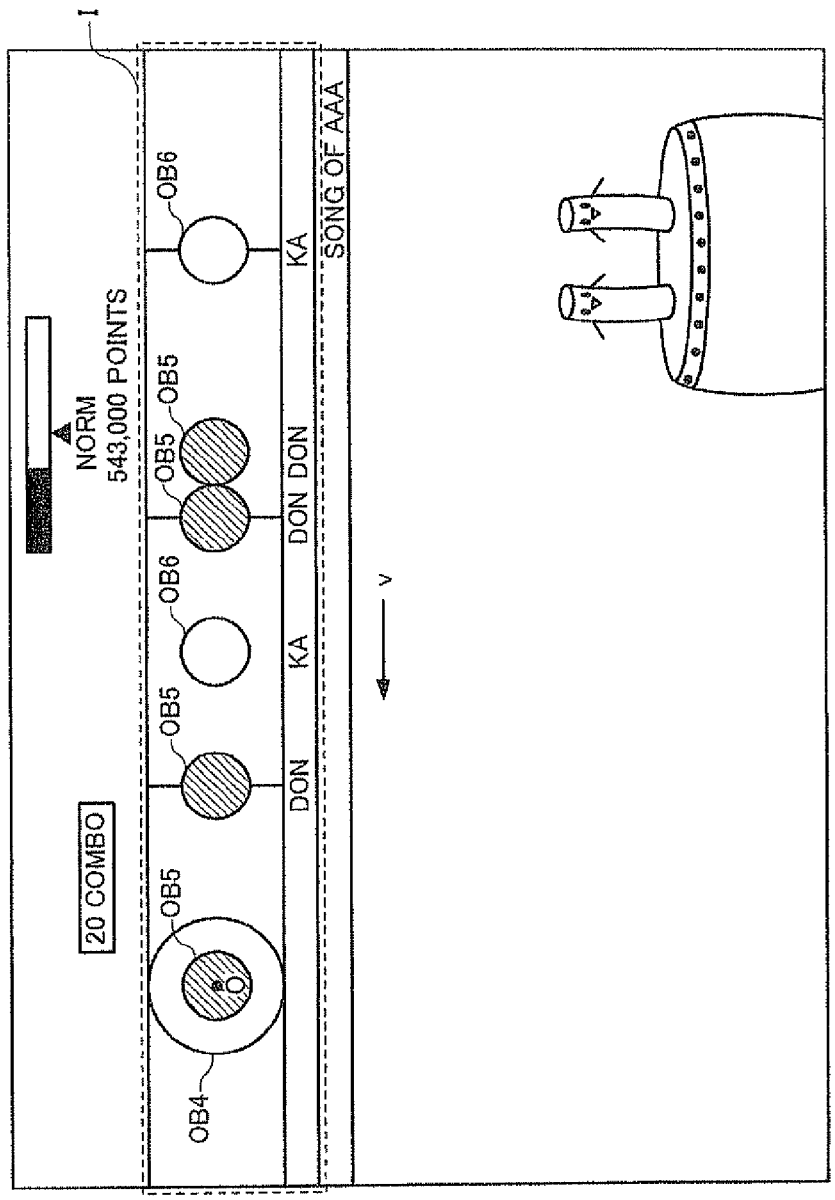
FIG. 32 is a diagram illustrating an example of a game screen according to one embodiment of the invention.

FIG. 32 illustrates an example of a display image displayed on the display section 190. Specifically, instruction marks OB5 and OB6 corresponding to each reference timing are moved along a moving path in synchronization with reproduction of the music data. More specifically, the instruction marks OB5 and OB6 are moved so that the instruction marks OB5 and OB6 are located at predetermined positions O at the reference timing. The input determination process is performed by comparing the input timing of the player with the reference timing.

The size of an area I including a determination reference object OB4 and the instruction marks OB5 and OB6 may be controlled based on the distance L between the body and the input section 60, the distance being determined based on the input image. For example, the scaling factor of the area I may be increased as the distance L increases, and may be reduced as the distance L decreases.

The moving speed v of the instruction marks OB5 and OB6 may also be controlled based on the distance L between the body and the input section 60, the distance being determined based on the input image.

For example, when the distance between the position GP of the input section 60 and the body is L1 (L1≤LD) (see FIG. 22), the moving speed of the instruction marks OB5 and OB6 is set to v1 (0<v1). When the distance between the position GP of the input section 60 and the body is L2 (L1≤LD<L2) (see FIG. 24), the moving speed of the instruction marks OB5 and OB6 is set to v2 (0<v2<v1). Specifically, the moving speed of the instruction marks OB5 and OB6 is decreased as the player moves away from the input section 60. This makes it possible for the player to determine the reference timing even if the player is positioned away from the input section 60.

In this embodiment, the moving direction of the instruction mark may be controlled based on the positional relationship between the body and the input section 60, the positional relationship being determined based on the reflected light image.

In the example illustrated in FIG. 28, it is determined that the player P is positioned on the left side of the input section 60 based on the reflected light image. In this case, the instruction marks OB5 and OB6 are moved in the leftward direction, as illustrated in FIG. 32.

Figure 33:
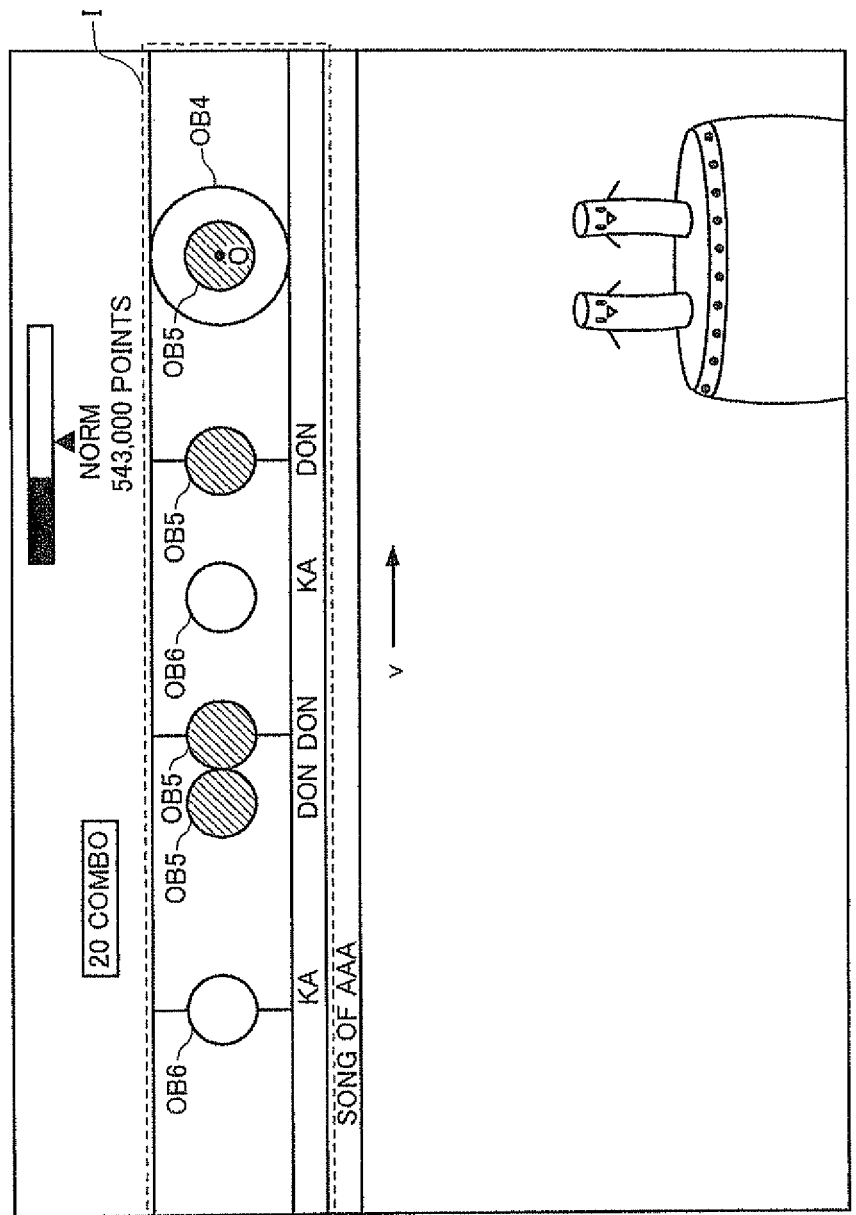
FIG. 33 is a diagram illustrating an example of a game screen according to one embodiment of the invention.

In the example illustrated in FIG. 30, it is determined that the player P is positioned on the right side of the input section 60 based on the reflected light image. In this case, the instruction marks OB5 and OB6 are moved in the rightward direction, as illustrated in FIG. 33.

Specifically, since the moving direction of the object in the virtual space can be determined based on the positional relationship between the body and the input section 60, the positional relationship being determined based on the input image, it is possible to provide a display image in which the instruction marks OB5 and OB6 are disposed at positions at which the instruction marks OB5 and OB6 can be easily observed by the player.

2-9. Details of Second Game System

Figure 34A:
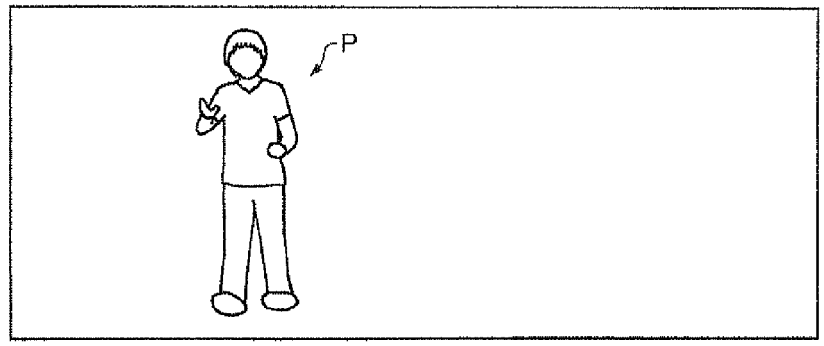
FIGS. 34A to 34D are diagrams illustrating a second game system according to one embodiment of the invention.

The second game system according to this embodiment determines the motion (movement) of the player as follows. As illustrated in FIG. 34A, the reflected light image (infrared radiation reflection results) is acquired by receiving reflected light from the body irradiated by the light-emitting section using the depth sensor 620.

Figure 34B:
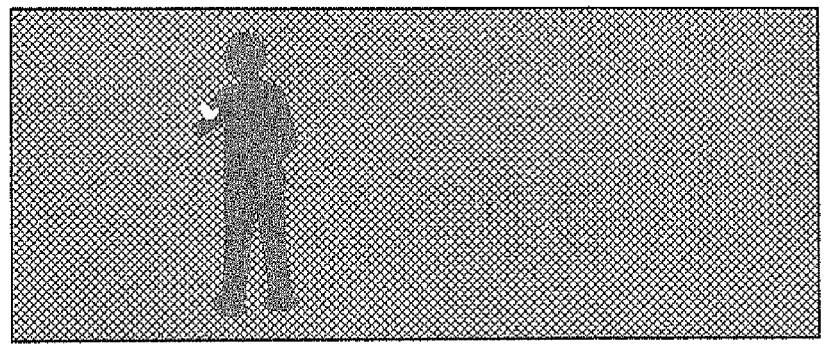
Figure 34C:
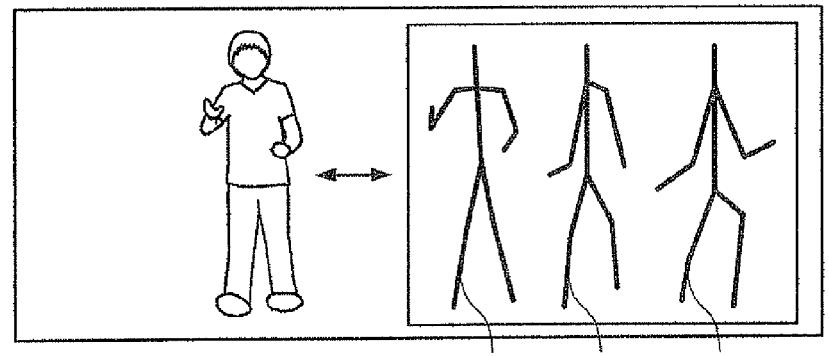
Figure 34D:
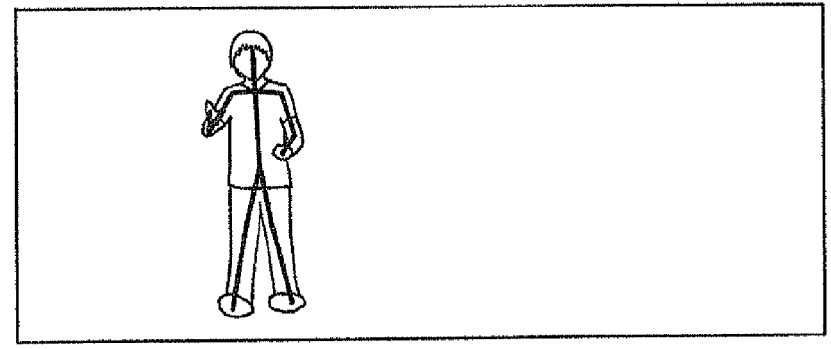

As illustrated in FIG. 34B, a human silhouette (shape) is extracted from the reflected light image. As illustrated in FIG. 34C, a plurality of bones (skeletons) stored in the storage section 660 or the like are compared with the silhouette, and a bone that agrees well with the silhouette is set. In the example illustrated in FIG. 34D, it is determined that a bone 1301 among bones BO1, BO2, and BO3 agrees well with the silhouette, and the motion (movement) of the bone BO1 is calculated. Specifically, the motion (movement) of the bone BO1 is taken as the motion (movement) of the player P. In this embodiment, the bone is specified every frame to acquire the motion (movement) of the player P.

Note that the process may be performed in human part units (e.g., arm bone and leg bone). In this case, a plurality of bones may be defined in advance in part units, and a bone that agrees well with the extracted silhouette may be determined in part units.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory computer-readable information storage medium storing a program that determines an input from an input section, the program causing a computer to function as:
   a timing determination section that determines whether or not an input start timing coincides with a reference start timing; and
   an input information determination section that determines whether or not input information that has been input during a given reference determination period that starts from the reference start timing coincides with defined input information, wherein:
   the timing determination section determines whether or not the input start timing coincides with an auxiliary start timing that corresponds to the reference start timing, but differs from the reference start timing;
   the input information determination section determines whether or not input information that has been input during a given auxiliary determination period that starts from the auxiliary start timing coincides with the defined input information;
   the timing determination section determines whether or not the input start timing coincides with each of a plurality of auxiliary start timings that differ from each other and that are defined corresponding to the reference start timing; and
   the input information determination section determines whether or not input information that has been input during a given auxiliary determination period that starts from an auxiliary start timing among the plurality of auxiliary start timings that has been determined to coincide with the input start timing, coincides with the defined input information.

2. The information storage medium as defined in claim 1, wherein a plurality of pieces of defined input information that differ from each other are defined corresponding to the reference determination period; and wherein the input information determination section determines whether or not input information that has been input during the reference determination period that starts from the reference start timing coincides with at least one of the plurality of pieces of defined input information when the input start timing coincides with the reference start timing.

3. The information storage medium as defined in claim 1, wherein the auxiliary determination period ends at an end timing of the reference determination period corresponding to the auxiliary determination period.

4. The information storage medium as defined in claim 1, wherein the program causes the computer to further function as an image generation section that generates an image that instructs the reference start timing and the reference determination period.

5. A non-transitory computer-readable information storage medium storing a program that determines an input from an input section, the program causing a computer to function as:
a timing determination section that determines whether or not an input start timing coincides with a reference start timing; and
an input information determination section that determines whether or not input information that has been input during a given reference determination period that starts from the reference start timing coincides with defined input information, wherein:
the timing determination section determines whether or not the input start timing coincides with an auxiliary start timing that corresponds to the reference start timing, but differs from the reference start timing;
the input information determination section determines whether or not input information that has been input during a given auxiliary determination period that starts from the auxiliary start timing coincides with the defined input information;
a plurality of pieces of defined input information that differ from each other are defined corresponding to the auxiliary determination period; and
the input information determination section determines whether or not input information that has been input during the auxiliary determination period that starts from the auxiliary start timing coincides with at least one of the plurality of pieces of defined input information when the input start timing coincides with the auxiliary start timing.

6. A non-transitory computer-readable information storage medium storing a program that determines an input from an input section, the program causing a computer to function as:
a timing determination section that determines whether or not an input start timing coincides with a reference start timing; and
an input information determination section that determines whether or not input information that has been input during a given reference determination period that starts from the reference start timing coincides with defined input information, wherein:
the timing determination section determines whether or not the input start timing coincides with an auxiliary start timing that corresponds to the reference start timing, but differs from the reference start timing;
the input information determination section determines whether or not input information that has been input during a given auxiliary determination period that starts from the auxiliary start timing coincides with the defined input information;
a first reference determination period that starts from a first reference start timing, and a second reference determination period that starts from a second reference start timing that occurs after the first reference start timing are defined so as not to overlap; and
an auxiliary determination period corresponding to the first reference determination period ends before the second reference start timing.

7. A non-transitory computer-readable information storage medium storing a program that determines an input from an input section, the program causing a computer to function as:
a timing determination section that determines whether or not an input start timing coincides with a reference start timing; and
an input information determination section that determines whether or not input information that has been input during a given reference determination period that starts from the reference start timing coincides with defined input information, wherein:
the timing determination section determines whether or not the input start timing coincides with an auxiliary start timing that corresponds to the reference start timing, but differs from the reference start timing;
the input information determination section determines whether or not input information that has been input during a given auxiliary determination period that starts from the auxiliary start timing coincides with the defined input information;
the defined input information includes a defined acceleration group including a plurality of accelerations;
the input information determination section determines whether or not an acceleration group including a plurality of accelerations detected from the input section during the reference determination period coincides with the defined acceleration group when the input start timing coincides with the reference start timing; and
the input information determination section determines whether or not an acceleration group including a plurality of accelerations detected from the input section during the auxiliary determination period coincides with the defined acceleration group when the input start timing coincides with the auxiliary start timing.

8. A non-transitory computer-readable information storage medium storing a program that determines an input from an input section, the program causing a computer to function as:
a timing determination section that determines whether or not an input start timing coincides with a reference start timing; and
an input information determination section that determines whether or not input information that has been input during a given reference determination period that starts from the reference start timing coincides with defined input information, wherein:
the timing determination section determines whether or not the input start timing coincides with an auxiliary start timing that corresponds to the reference start timing, but differs from the reference start timing;
the input information determination section determines whether or not input information that has been input during a given auxiliary determination period that starts from the auxiliary start timing coincides with the defined input information;

the defined input information includes a defined moving path;

the input information determination section determines whether or not a moving path detected from the input section during the reference determination period coincides with the defined moving path when the input start timing coincides with the reference start timing; and the input information determination section determines whether or not a moving path detected from the input section during the auxiliary determination period coincides with the defined moving path when the input start timing coincides with the auxiliary start timing.

9. A non-transitory computer-readable information storage medium storing a program that determines an input from an input section, the program causing a computer to function as:

a timing determination section that determines whether or not an input start timing coincides with a reference start timing; and an input information determination section that determines whether or not input information that has been input during a given reference determination period that starts from the reference start timing coincides with defined input information, wherein:

the timing determination section determines whether or not the input start timing coincides with an auxiliary start timing that corresponds to the reference start timing, but differs from the reference start timing;

the input information determination section determines whether or not input information that has been input during a given auxiliary determination period that starts from the auxiliary start timing coincides with the defined input information:

the defined input information includes a defined moving vector that defines a moving amount and a moving direction of a feature point between images;

the input information determination section determines whether or not a moving vector between a plurality of input images acquired from the input section during the reference determination period coincides with the defined moving vector when the input start timing coincides with the reference start timing; and the input information determination section determines whether or not a moving vector between a plurality of input images acquired from the input section during the auxiliary determination period coincides with the defined moving vector when the input start timing coincides with the auxiliary start timing.

10. A game system that determines an input from an input section, the game system comprising:

a timing determination section that determines whether or not an input start timing coincides with a reference start timing; and an input information determination section that determines whether or not input information that has been input during a given reference determination period that starts from the reference start timing coincides with defined input information, wherein:

the timing determination section determining whether or not the input start timing coincides with an auxiliary start timing that corresponds to the reference start timing, but differs from the reference start timing;

the input information determination section determines whether or not input information that has been input during a given auxiliary determination period that starts from the auxiliary start timing coincides with the defined input information;

the timing determination section determines whether or not the input start timing coincides with each of a plurality of auxiliary start timings that differ from each other and that are defined corresponding to the reference start timing; and the input information determination section determines whether or not input information that has been input during a given auxiliary determination period that starts from an auxiliary start timing among the plurality of auxiliary start timings that has been determined to coincide with the input start timing, coincides with the defined input information.

11. An input determination method that is implemented by a game system that determines an input from an input section, the input determination method comprising:

determining whether or not an input start timing coincides with a reference start timing;

determining whether or not input information that has been input during a given reference determination period that starts from the reference start timing coincides with defined input information;

determining whether or not the input start timing coincides with an auxiliary start timing that corresponds to the reference start timing, but differs from the reference start timing;

determining whether or not input information that has been input during a given auxiliary determination period that starts from the auxiliary start timing coincides with the defined input information;

determining whether or not the input start timing coincides with each of a plurality of auxiliary start timings that differ from each other and that are defined corresponding to the reference start timing; and determining whether or not input information that has been input during a given auxiliary determination period that starts from an auxiliary start timing among the plurality of auxiliary start timings that has been determined to coincide with the input start timing, coincides with the defined input information.

* * * * *